(12) United States Patent
Ranzinger et al.

(10) Patent No.: US 10,437,878 B2
(45) Date of Patent: Oct. 8, 2019

(54) IDENTIFICATION OF A SALIENT PORTION OF AN IMAGE

(71) Applicant: SHUTTERSTOCK, INC., New York, NY (US)

(72) Inventors: Mike Ranzinger, Boulder, CO (US); Heath Hohwald, Logrono (ES); Nathan Hurst, Seattle, WA (US)

(73) Assignee: Shutterstock, Inc., New York, NY (US)

( * ) Notice: Subject to any disclaimer, the term of this patent is extended or adjusted under 35 U.S.C. 154(b) by 205 days.

(21) Appl. No.: 15/393,206

(22) Filed: Dec. 28, 2016

(65) Prior Publication Data

US 2018/0181593 A1    Jun. 28, 2018

(51) Int. Cl.
| | | |
|---|---|---|
| *G06F 17/30* | (2006.01) | |
| *G06F 16/583* | (2019.01) | |
| *G06K 9/62* | (2006.01) | |
| *G06K 9/46* | (2006.01) | |
| *G06N 3/08* | (2006.01) | |

(52) U.S. Cl.
CPC ....... *G06F 16/5838* (2019.01); *G06K 9/4604* (2013.01); *G06K 9/4628* (2013.01); *G06K 9/6203* (2013.01); *G06K 9/6274* (2013.01); *G06N 3/084* (2013.01)

(58) Field of Classification Search
CPC ......... G06F 17/30256; G06F 17/30286; G06F 17/30864; G06F 16/5838; G06F 16/20; G06F 16/951
USPC ....................................................... 707/723
See application file for complete search history.

(56) References Cited

U.S. PATENT DOCUMENTS

| | | | | |
|---|---|---|---|---|
| 8,352,465 B1* | 1/2013 | Jing | ............ | G06F 17/30867 707/723 |
| 9,635,276 B2* | 4/2017 | Sen | ............ | H04N 5/2353 |
| 2006/0101060 A1* | 5/2006 | Li | ............ | G06F 17/30247 707/802 |
| 2007/0047802 A1* | 3/2007 | Puri | ............ | G06K 9/4628 382/157 |
| 2010/0332210 A1* | 12/2010 | Birdwell | ............ | G06F 17/30442 703/22 |
| 2011/0317923 A1* | 12/2011 | Hondo | ............ | G06F 17/30247 382/190 |

(Continued)

FOREIGN PATENT DOCUMENTS

RU        2424561 C2 *  7/2011   ......... G06K 9/4628

*Primary Examiner* — Shahid A Alam
(74) *Attorney, Agent, or Firm* — McDermott Will & Emery LLP

(57) ABSTRACT

Various aspects of the subject technology relate to systems, methods, and machine-readable media for identification of a salient portion of an image. A system may receive user input identifying a search query for content from a client device. The system may determine a listing of images responsive to the search query from an image collection. The system may obtain one or more image crops for at least one image of the listing of images based on a saliency map of the at least one image. In one or more implementations, each of the one or more image crops indicates a salient region of a corresponding image. The system may provide a set of search results responsive to the search query to the client device. In one or more implementations, the set of search results includes the obtained one or more image crops in a prioritized listing of image crops.

20 Claims, 17 Drawing Sheets

(56) References Cited

U.S. PATENT DOCUMENTS

| | | | |
|---|---|---|---|
| 2013/0148910 A1* | 6/2013 | Fredembach | G06K 9/40 382/275 |
| 2014/0201219 A1* | 7/2014 | Kim | G06F 17/30247 707/749 |
| 2015/0058327 A1* | 2/2015 | Frank | G06Q 10/06 707/722 |
| 2017/0249339 A1* | 8/2017 | Lester | G06F 17/30256 707/723 |

* cited by examiner

IDENTIFICATION OF A SALIENT PORTION OF AN IMAGE

BACKGROUND

Field

The present disclosure generally relates to a computer-based image retrieval system, and more particularly to identification of a salient portion of an image.

Description of the Related Art

When a user performs a search of a collection of items using a search query, an information retrieval (IR) system commonly matches a user's search terms from the search query with content items from the collection that are most relevant to the user's search query. The problem of finding a desired multimedia item for the user in response to the search query in a very large collection can be quite daunting. With potentially hundreds of millions of items, the task for the IR system of indicating to the user the item (e.g., image or images) that closely matches the semantic concept the user had in mind is challenging. Producing search results that lead users to discovery of the most relevant images using the least amount of system latency between the time that a search result is presented and the time that a user makes a selection from the search result can be challenging in traditional IR systems.

SUMMARY

The present disclosure describes a system that maps an input image to a saliency map that identifies both the contents (or objects) present in an image as well as their location in the image, identified by a relative strength at either the pixel level or over a discretized grid. This mapping can be exploited to "autocrop" the most relevant portion of an image, identifying the most salient object and its location within the image. The system either obtains image crops of the image from an index or generates the image crops at runtime. In turn, the system provides a set of search results responsive to the search query to the client device, where the search results include crops of images in a prioritized listing.

According to one embodiment of the present disclosure, a computer-implemented method is provided. The method includes receiving user input identifying a search query for content from a client device. The method includes determining a listing of images responsive to the search query from an image collection. The method includes obtaining one or more image crops for at least one image of the listing of images based on a saliency map of the at least one image. In one or more implementations, each of the one or more image crops indicates a salient region of a corresponding image. The method also includes providing a set of search results responsive to the search query to the client device. In one or more implementations, the set of search results includes the obtained one or more image crops in a prioritized listing of image crops.

According to one embodiment of the present disclosure, a system is provided including one or more processors and a computer-readable storage medium coupled to the one or more processors, the computer-readable storage medium including instructions that, when executed by the one or more processors, cause the one or more processors to perform a method. The method includes receiving user input identifying a search query for content from a client device. The method includes determining a listing of images responsive to the search query from an image collection. The method includes determining whether one or more image crops associated with at least one image of the listing of images is indexed. The method includes obtaining at least one indexed image crop from a data structure when the one or more image crops associated with the at least one image are indexed. The method includes generating one or more image crops from the at least one image based on a saliency map of the at least one image. The method includes providing a set of search results responsive to the search query to the client device. In one or more implementations, the set of search results includes the indexed image crops or the generated image crops in a prioritized listing of image crops. In one or more implementations, each image crop of the prioritized listing of image crops indicates a salient region of a corresponding image.

According to one embodiment of the present disclosure, a non-transitory computer readable storage medium is provided including instructions that, when executed by a processor, cause the processor to perform a method. The method includes receiving user input identifying a search query for content from a client device. The method includes determining a listing of images responsive to the search query from an image collection. The method includes obtaining one or more image crops for at least one image of the listing of images based on a saliency map of the at least one image. In one or more implementations, each of the one or more image crops indicates a salient region of a corresponding image. The method also includes providing a set of search results responsive to the search query to the client device. In one or more implementations, the set of search results includes the obtained one or more image crops in a prioritized listing of image crops.

According to one embodiment of the present disclosure, a system is provided that includes means for receiving user input identifying a search query for content from a client device; and means for (1) determining a listing of images responsive to the search query from an image collection; (2) obtaining one or more image crops for at least one image of the listing of images based on a saliency map of the at least one image, in which each of the one or more image crops indicates a salient region of a corresponding image; and (3) providing a set of search results responsive to the search query to the client device, in which the set of search results includes the obtained one or more image crops in a prioritized listing of image crops.

According to one embodiment of the present disclosure, a computer-implemented method is provided. The method includes receiving user input via an application on a client device, the user input indicating a request to initiate an image search. The method includes generating, in response to the received user input, an image search query including a search term from the user input. The method includes providing for transmission the image search query over a connection to a server. In one or more implementations, the server includes an image search service that obtains one or more image crops for at least one image of a listing of images responsive to the image search query based on a saliency map of the at least one image. In one or more implementations, each of the one or more image crops indicates a salient region of a corresponding image. The method also includes receiving a set of search results responsive to the search query from the server. In one or more implementations, the set of search results includes the obtained one or more image crops in a prioritized listing of image crops.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
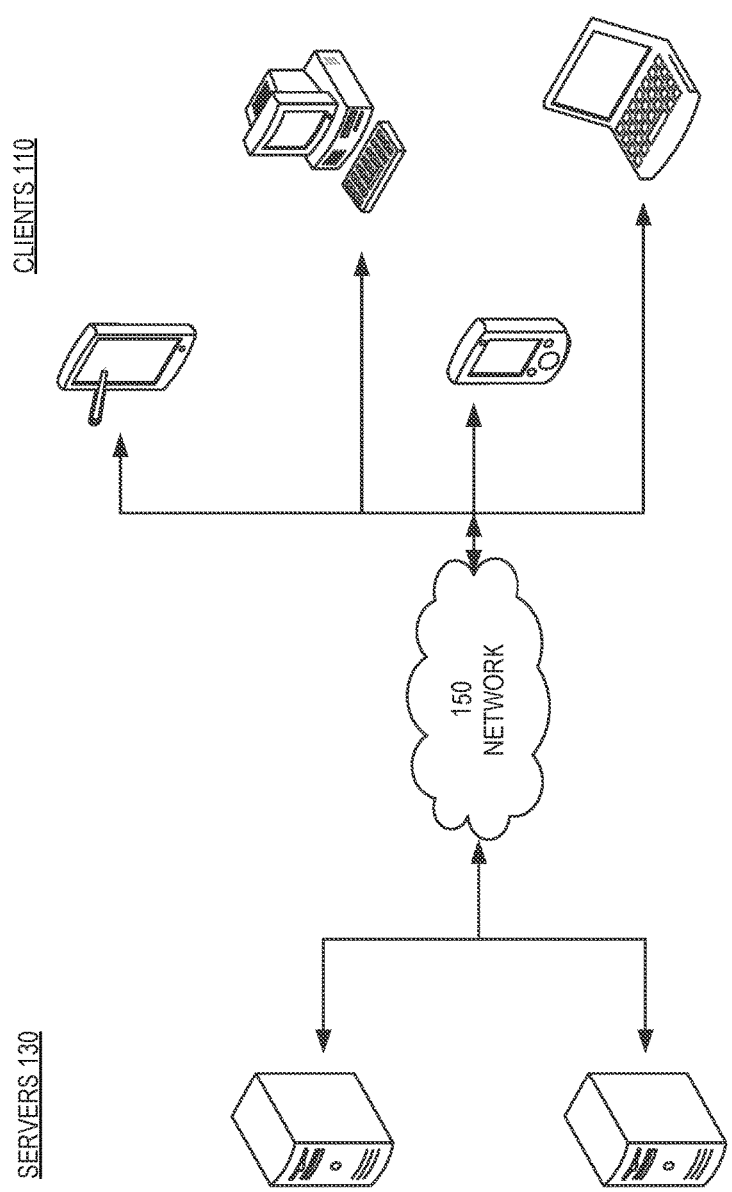
FIG. 1 illustrates an example architecture for identification of a salient portion of an image suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. As used herein, the term "saliency" may refer to the quality by which an object within an image (e.g., a foreground object) is deemed most useful for a neural network to perform the classification task. The term "saliency map" as used herein may refer to a mapping where each pixel has an associated value with its particular saliency value, where the saliency value of a pixel may refer to as the normalized attention that the pixel has in the overall scene. The term "training data" as used herein may refer to as a set of images containing positive instances of desired classes and a set of images used as negative instances (i.e., excluding any instance of the desired classes) used to train an object classifier. As used herein, the term "search term" may refer to a word in a query or portion of a query comprised of a string of text, which may be a single term or multiple terms.

General Overview

A very common workflow for a user of an image retrieval system is begin with a mental conception of an ideal image for a particular purpose. The user then issues a textual query to the IR system where the query is intended to capture in words their mental conception. The IR system then returns a set of images, at which point the user browses through the images, many of which are likely irrelevant, hoping to find one that is relevant. Composition is often an important factor in identifying a relevant image. After selecting an image, it is very common for the user to then post-process the image, with cropping out the relevant portion of the image as one of the most common tasks. Moreover, it is distracting to users to look at entire images when the portion they care about may be a sub-crop of the image.

The ability to map an input image to a saliency map is described, which identifies both the contents (or objects) present in an image as well as their location in the image, and identified by a relative strength at either the pixel level or over a discretized grid. This mapping can be exploited to "autocrop" the most relevant portion of an image, identifying the most salient object and its location within the image. Autocropping and its associated methodology has multiple implications for improving image search and discovery.

In one or more implementations, autocropping is performed by: (1) identifying one or more image crops, with various sizes, from a given image to optimize the preserved content when downsizing a large image, e.g. choosing an image crop of a particular required size for the inclusion in a web page; (2) supplementing an image collection with additional image crops that are deemed relevant, allowing for increased relevancy in a set of image search results while simultaneously minimizing required post processing; (3) providing an enhanced mosaic layout that auto crops the most salient portion of an image for display, optimizing signal to noise ratio in available pixel real estate when displaying thumbnails in a search result display, and (4) providing automatic visual embellishment of an image to focus attention on the most salient region of the image.

The issues concerning discovery of the most relevant images from a search result are also addressed by indexing crops of images directly into the search index and returning them along with regular search results. This can also help create multiple images from a single image because there can be potentially more than one relevant autocrop from a single image. By indexing each individually, an image that may have been marginally relevant to some queries can become quite relevant. For example, for the query "dog", a crop of only the dog would be more relevant than an original image that contains a man, woman, and dog.

The disclosed system addresses a problem in the traditional IR systems, system latency in the discovery of the most relevant images from a search result, which is a problem specifically arising in the realm of computer technology, by providing a solution also rooted in computer technology, namely, by considering a search engine system using an object classifier for classifying salient objects in images using a salient map of the images and identifying these salient objects in image search results. The object classifier can classify the strength with which an image exhibits certain known objects. The system may use an algorithm that detects the set of objects from a set of example images, referred to as training data. The disclosed system includes training of a series of computer-operated neural networks, such as a convolutional neural network, to teach the neural network to identify features of images mapping to certain object classes for identifying those images that are responsive to an input search query with a probability that a region of an image is deemed salient. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, then process those features against a number of object classes. The disclosed system produces a set of vectors representing the object classifications for the corpus of images in the training data. The objects are learned from running the convolutional neural network over a corpus of the training data. The trained convolutional neural network can provide a probability distribution where each data point in the distribution corresponds to a likelihood that the image includes a corresponding object. In one or more implementations, the trained convolutional neural network provides a probability that a region of an image is salient. The disclosed system determines the probability that such training image contains a salient object based on probabilistic computations per object class for that training image. Once the convolutional neural network has been trained to predict probabilistically which features of the training images identify certain object classes, the disclosed system generates metadata for each example image indicating the salient object and its location within the image. In this respect, the disclosed system can then modify the original search results by incorporating items (e.g., thumbnails) that represent the salient objects for each original search result image.

The subject system provides several advantages including providing classified images that identify salient portions of the images. The system provides a machine learning capability where the system can learn from a content item and associated objects in order to refine search results with highly-relevant content items. In this regard, the refined search results would yield content items with features that exploit the salient objects and their location within the images to facilitate the user's ability to filter through the search results. With this approach, the system can continually improve its accuracy (and keep up with trending differences of what certain salient objects look like) by incorporating user interaction data into its convolution-based salient map model. By presenting results to the user, identifying the media that a user interacts with (e.g., indicating which features among other features of an image received the most attention), and examining the results that a user ignores (e.g., indicating which features among other features of an image received the least attention), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes and which regions of the images are deemed salient. At runtime, the search query produces a search space that includes items representing salient regions of images based on a salient map of each subject image from original search results, thus reducing the cost of images provided for display (i.e., less bandwidth resources). Given that the subject system continues to learn and refine itself to match user preferences from a search query, modifying search results in real-time to emphasize the most salient region of each image in a listing of images reduces the system latency due to a lesser amount of time needed for a user to locate a desired search result image.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for identification of a salient portion of an image suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient objects. The servers 130 can return images tagged with metadata indicating one or more salient objects and their locations within the images to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Salient Region Identification System

Figure 2:
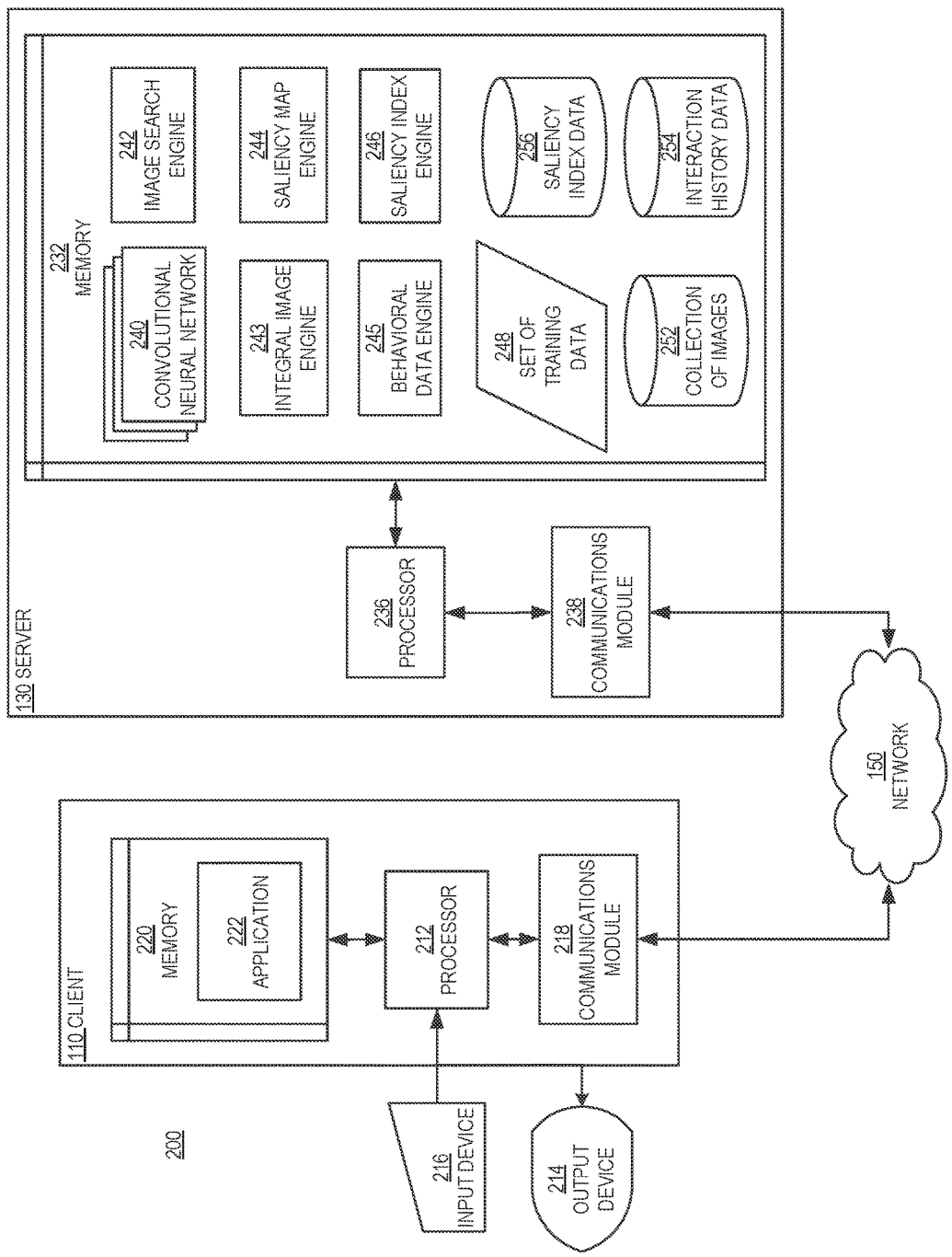
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, an integral image engine 243, a saliency map engine 244, a behavioral data engine 245 and a saliency index engine 246.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 can include a loss layer (e.g., softmax or hinge loss layer) to back propagate errors so that the convolutional neural network 240 learns and adjusts its weights to better fit provided image data. In one or more implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height×width), and produce an output tensor (e.g., batch size×number of new feature maps×new height×width). Examples of the spatial operator layer may include convolution, average pool, max pool, etc. The average-over-width-height layer may be configured to receive an input tensor of the configuration (e.g., batch size×number of feature maps×height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes), where number of classes is based on the classification problem. To determine saliency, a vector after the averaged values from the average-over-width-height layer is obtained, and the cosine distance between the average vector against each vector (e.g., number of feature maps) from the previous spatial operator layer is then computed, thus producing a tensor of the configuration (e.g., batch size×height×width). In one or more implementations, the cosine distance between the output of the fully connected layer corresponding to a specified class and the output of the spatial operator layer is used to determine the saliency with respect to a specific class.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. Each of the images may include an indication of one or more salient objects present in the image based on the corresponding object classes applicable to the image. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. In one or more implementations, each input image may be decomposed into a set of non-overlapping regions, each of which may have uniform saliency values.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. The set of training data 248 may include multiple instances (or sets) of training data, where one instance (or set) of training data is associated with an intended object class and another instance (or set) of training data is not associated with the intended object class. For example, the set of training data 248 may include images that include features that represent positive instances of a desired class so that the convolutional neural network 248 can be trained to recognize images with a feature of the desired class. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, there is a predetermined number of object classes that corresponds to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, salient object (or region) shown, and salient object (or region) selected. The behavioral data engine 245 may keep track of the frequency that a certain salient object or region is selected or which salient objects or regions are commonly selected.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on the salient objects or regions of the most-recent images downloaded or clicked by the user. For example, the processor 236 may determine that a user interacted with an image from a search result, such as, by clicking on a segment (or region) of the image identified as salient, saving the image for subsequent access, or downloaded the image to a client (e.g., client 110), or the like. The processor 236 may keep track of the user interactions with a number of images over a given time period. In one or more implementations, the processor 236 may track the learned salient objects or regions of the last N images that the user interacted with as well as a current user query, where N is a positive integer value. The interaction history 254 may also include data indicating search behavior (and/or patterns) relating to prior image search queries.

The saliency map engine 244 may be a module executed by the processor 236 that is configured to identify the most salient and prominent objects in an image and their location within the image using the convolutional neural network 240. In one or more implementations, the saliency map engine 244 is configured to perform autocropping of images based on the saliency of a region in the image. For example, the saliency map engine 244 may identify one or more image crops, with various sizes, from a given image to optimize the preserved content when downsizing a large image, e.g. choosing an image crop of a particular required size for the inclusion in a web page. In one or more implementations, the processor 236 provides an example image to the saliency map engine 244 such that a trained convolutional neural network determines a saliency of each pixel in the example image with respect to an overall scene of the example image. In one or more implementations, the saliency map engine 244 is configured to generate a saliency map of the example image using the trained convolutional neural network 240. For each pixel in the example image, the saliency map can provide how likely the pixel belongs to a salient object (or salient region).

In one or more implementations, the processor 236, using the saliency map engine 244, supplements an image collection with additional image crops that are deemed relevant, allowing for increased relevancy in a set of image search results while simultaneously minimizing required post processing. In one or more implementations, the processor 236, using the saliency map engine 244, provides an enhanced mosaic layout that auto crops the most salient portion of an image for display, optimizing signal to noise ratio in available pixel real estate when displaying thumbnails in a search result display. In one or more implementations, the processor 236, using the saliency map engine 244, provides automatic visual embellishment of an image to focus attention on the most salient region of the image.

The integral image engine 243 may be a module executed by the processor 236 that is configured to determine an integral image of an example image, in which each pixel value of the integral image is different from that of the example image based on the saliency map from the saliency map engine 244. In one or more implementations, the processor 236, using the integral image engine 243, for each fixed region with a predetermined aspect ratio within the example image, determines a sum of all of the saliency pixels over the fixed region in constant time. For example, for each aspect ratio that an autocrop operation is intended, a virtual box with the specified aspect ratio is incrementally shifted over the integral image, and the maximum sum of saliency for all valid boxes within the image can be recorded. The box that contains the maximum sum defines the bounds for the image crop.

The saliency index engine 246 may be a module executed by the processor 236 that is configured to index crops of images directly into a search index, and returning the indexed crops of images along with a regular set of search results. In one or more implementations, the saliency index engine 246 is configured to provide metadata from each image in the collection of images 252 to a saliency index data structure (e.g., saliency index data 256). In one or more implementations, the saliency index engine 246 is configured to provide tuples of image information from the saliency map engine 244 to the saliency index data structure. In one or more implementations, the saliency index engine 246 is configured to generate an association between each tuple of image information with a corresponding image of the collection of images 252 in the saliency index data structure. In one or more implementations, the saliency index engine 246 is configured to provide an index for each generated association in the saliency index structure, such that crops of images are indexed and returned with a listing of search results with lesser required system latency.

In one or more implementations, the saliency index engine 246 is configured to search a search term against index entries of the saliency index data structure, where the search term is part of a search query provided to the image search engine 242. In one or more implementations, the saliency index engine 246 is configured to determine that the search term corresponds to the metadata from at least one index entry of the saliency index data structure. In one or more implementations, the saliency index engine 246 is configured to determine a score (e.g., crop informed score) for each image crop associated with an image from the at least one index entry using the metadata associated with the image. For example, saliency index engine 246 may compare the textual fields of the search query (e.g., the search term) to the metadata of the image (i.e., originally sized image) as well as a field value associated with the image crop (e.g., crop tag field). In one or more implementations, the image crop field value may include an associated weight that is tunable based on behavioral data (e.g., the user interaction data 254). In one or more implementations, the score for an image crop is expressed as crop_informed_score=original IR score+ w_1*crop_tag_score, where crop_tag_score is zero if the search query does not textually match the indexed image crop field value, and w_1 is the weight value associated with the image crop. If the crop_tag_score does match the image crop field value, then w_1 captures the extent to which the image search engine 242 prioritizes crop matches.

The saliency index data 256 may be a data structure including an array of entries, where each entry includes information relating to an image, a corresponding image crop and a tuple of image information associated with the image and the corresponding image crop. For example, the saliency index data 256 may include the originally-sized image as well as associated metadata indicating one or more image identifiers and/or keywords for the image. In one or more implementations, the saliency index data 256 includes tuples of image information that indicates the image identifier, the image crop field value, and image crop coordinates for a given image. In one or more implementations, the saliency index data 256 includes coordinates (e.g., (x1, y1), (x2, y2)) of an image crop, where (x1, y1) is the upper-left coordinate and (x2, y2) is the bottom-right coordinate. In one or more implementations, the saliency index data 256 includes a score of a corresponding image crop, which is accessible to both the image search engine 242 and the saliency index engine 246 at runtime for prioritizing a listing of image crops.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

In certain aspects, the processor 236 of the server 130 is configured to receive a user input from a user. The user input identifies a search query in a given natural language. For example, the search query may be entered as an English term. A user of the client 110 may use the input device 216 to submit a search term or phrase via a user interface of the application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the number of natural languages used is not limited to English, and the number of natural languages can vary to include other natural languages depending on implementation.

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. The processor 236 then receives an identification of a plurality of images from the collection of images 252 that are responsive to the search query. The processor 236, then provides each of the plurality of images to the convolutional neural network 240 to determine a saliency of each pixel in the image with respect to an overall scene of the image. In one or more implementations, the processor 236, using the image search engine 242 and the saliency map engine 244, generates a saliency map from an output layer of the convolutional neural network 240 that indicates how likely each pixel in the image is salient. The processor 236, using the saliency map engine 244, can find the salient objects and their locations within the image.

In one or more implementations, the processor 236, using the integral image engine 243, auto crops the image by cropping a region of the image that corresponds to the fixed region having a maximum sum of saliency, in which the region of the image may be cropped to one of a plurality of predetermined aspect ratios (e.g., 1200×1200, 1200×627, 851×315, 1080×1080, etc.). In one or more implementations, the processor 236, using the saliency index engine 246, provides an index of image crops for easy search and retrieval. In one or more implementations, the processor 236, using the saliency map engine 244 and the image search engine 242, generates image crops that have as aspect ratio that is smaller than a predetermined aspect ratio threshold from search result images that exceeded the predetermined aspect ratio threshold (e.g., panoramic images), where the threshold indicates the maximum size of an image for display in a search result. In one or more implementations, the processor 236, using the saliency map engine 244, modifies one or more pixel values using a weighted filter to generate a masking over a non-salient portion of the image based on the saliency map.

In one or more implementations, the processor 236, using the image search engine 242, provides search results that includes a listing of images as well as a listing of image crops. The listing of images along with the listing of image crops may be prioritized (or ranked) according to the user interaction data 254 provided, for example, by the processor 236, using the behavioral data engine 245, to gather metrics relating to the user interaction with images from previous (and current) search results. The processor 236 may then provide the listing of images to the application 222 on the client 110 over the network 150 for display by an output device 214 of the client 110.

Figure 3A:
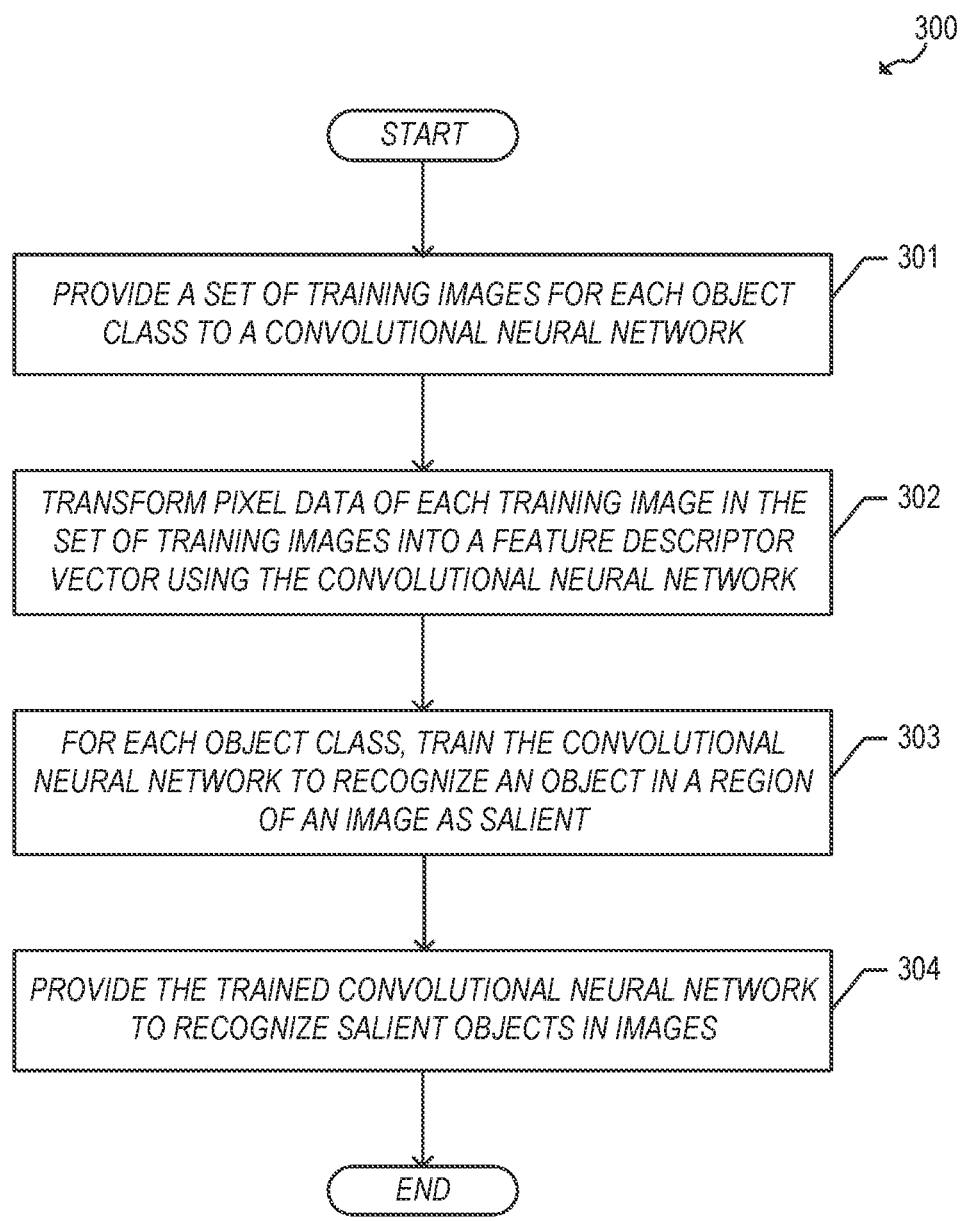
FIG. 3A illustrates an example process of training a convolutional neural network for identification of a salient portion of an image using the example server of FIG. 2.

FIG. 3A illustrates an example process 300 of training a convolutional neural network for identification of a salient portion of an image using the example server of FIG. 2. While FIG. 3A is described with reference to FIG. 2, it should be noted that the process steps of FIG. 3A may be performed by other systems.

The process 300 begins by proceeding from start step to step 301 when a set of training data 248 (e.g., training images) is fed through a convolutional neural network 240. For example, the convolutional neural network 240 can consist of a stack of six layers with weights, the first five layers being convolutional layers and the remaining layer being a fully-connected layer that serves as the classifier. The set of training data 248 can be an arbitrary fixed-size (e.g., 242×242 pixel) Black-White image data or Red-Green-Blue (RGB) image data. In one or more implementations, the set of training data 248 employs fixed image crops using a size specified by a design of the convolutional neural network 240. In one or more implementations, the set of training data 248 includes a data file containing pixel data for each training image. The set of training data 248 may include a different set of training images for each object class. For example, the set of training data 248 may include positive instances of a desired object class. The number of sets (or instances) of the training data included in the set of training data 248 may be an arbitrary number and may vary depending on implementation.

Subsequently, in step 302, the convolutional neural network 240 transforms pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and an object classification by analyzing pixel data of the image. Training with the set of training data 248 may be regularized by weight decay, and the learning rate may initially be set to $10^{-2}$ and then decreased by a factor of 10 when validation set accuracy stops improving for the convolutional neural network 240. The feature extraction algorithm executed by the convolutional neural network 240 may be implemented with three fully connected layers of the convolutional neural network 240.

Next in step 303, for each object class, the convolutional neural network 240 is trained to recognize an object in a region of an image as salient. The convolutional neural network 240 may be trained to identify the most salient objects and their location within the image. The convolutional neural network 240 may be trained to first classify the image to a class. To compute the saliency of a region in the classified image, a vector after the averaged values from the average-over-width-height layer is obtained, and the cosine distance between the average vector against each vector (e.g., number of feature maps) from the previous spatial operator layer is then computed, thus producing a tensor of the configuration (e.g., batch size×height×width). In one or more implementations, the cosine distance between the output of the fully connected layer corresponding to a specified class and the output of the spatial operator layer is used to determine the saliency with respect to a specific class.

Next in step 304, the trained convolutional neural network 240 is provided to recognize salient objects (or regions) of images at runtime. The process to produce an object classifier ends following step 304.

Figure 3B:
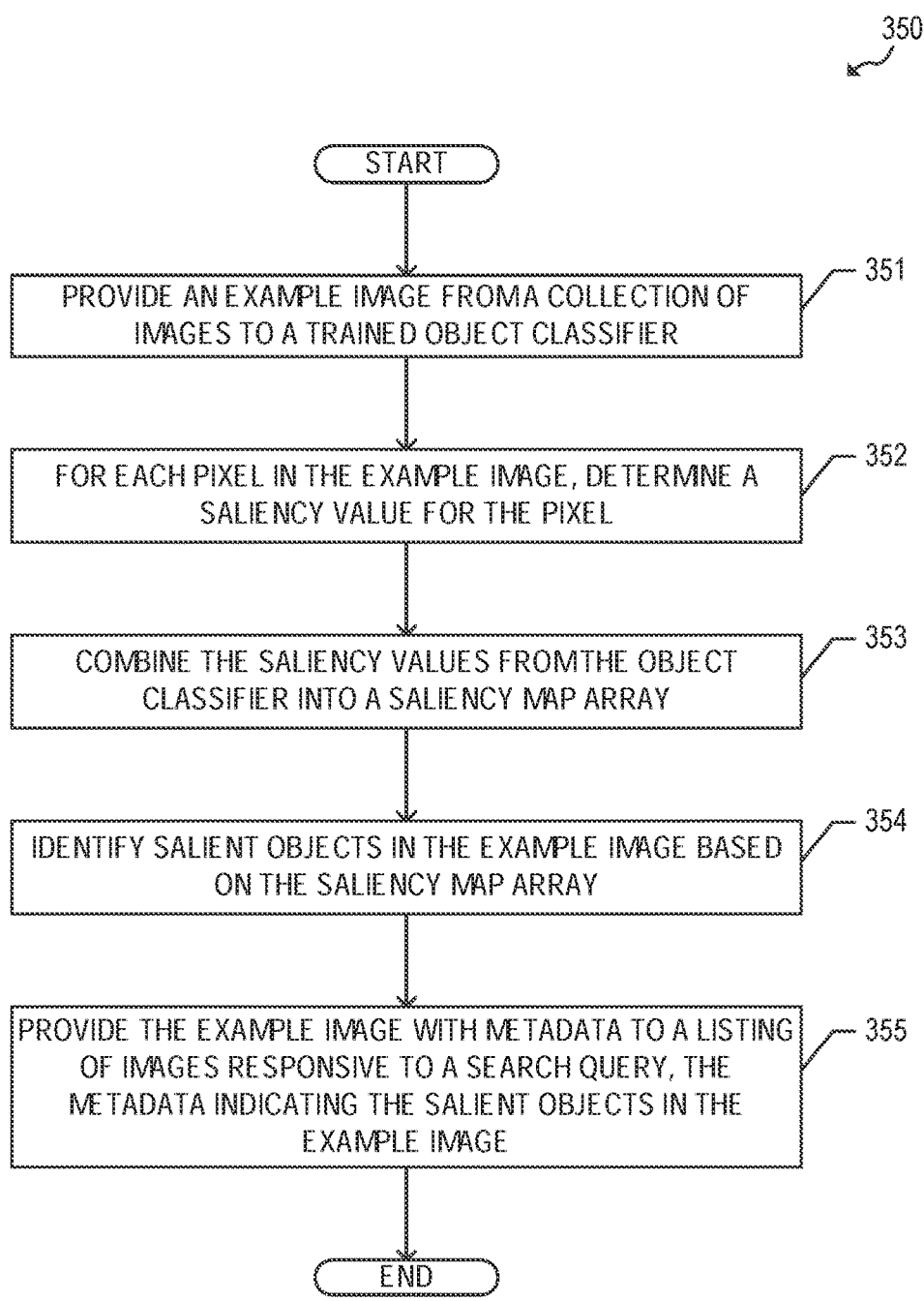
FIG. 3B illustrates an example process of identifying a salient portion of an image using the example server of FIG. 2.

FIG. 3B illustrates an example process 350 of identifying a salient portion of an image using the example server of FIG. 2. While FIG. 3B is described with reference to FIG. 2, it should be noted that the process steps of FIG. 3B may be performed by other systems. The process 350 begins by proceeding from start step to step 351 when an example image from the collection of images 252 is fed to a trained object classifier (e.g., salient map engine 244) to determine a saliency for a certain region or object within the example image.

Next, in step 352, for each pixel in the example image, the object classifier determines a saliency value for the pixel. The saliency determination can be expressed as: If $a=(1/|v|)$ sum($v\_xy$), then $s(x,y)=a\_t*v\_xy$, where $\_xy$ denotes a spatial position, $\_t$ denotes the transpose of a matrix or vector, $s(x,y)$ denotes the saliency at position x,y, and $v\_xy$ is a spatial feature vector. Because of the averaging, feature vectors that are closest to the average vector are considered most salient to the classification, and those furthest from the average vector are considered irrelevant to the classification. Thus, a map of saliency can be obtained by comparing each (downsampled) spatial feature vector from the convolutional neural network 240 to the averaged (over all spatial vectors) feature vector. In one or more implementations, an identifier such as a tag or a label associated with the example image may be used by the object classifier to indicate the degree of saliency of one or more regions of the image.

Subsequently, in step 353, the saliency values from the object classifiers are combined together into a saliency map array. In one or more implementations, the saliency map array represents a three-dimensional waveform, where the x-y dimensions refer to the positions of class objects and the z-dimension refers to saliency values corresponding to the respective class objects. In step 354, the subject system identifies salient objects in the example image based on the saliency map array. In one or more implementations, the subject system provides an object name and the coordinates locating the salient object in the image.

Next, in step 355, the subject system provides the example image with metadata to a listing of images responsive to a search query. In one or more implementations, the metadata indicates the salient objects in the example image. In some embodiments, the metadata includes information with respect to the segmentation of the image such that one or more regions representing respective salient objects are indicated within the image.

Figure 4:
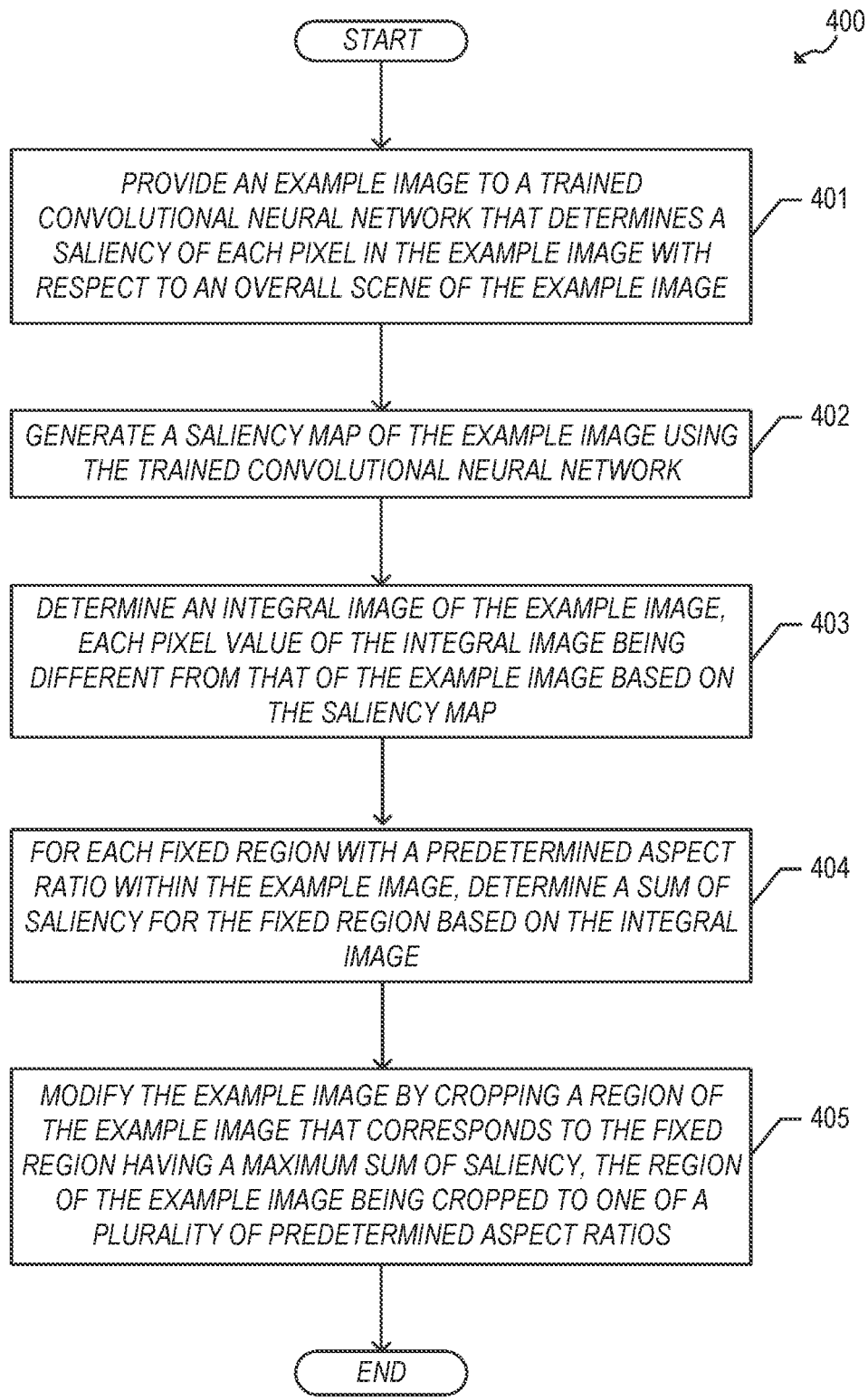
FIG. 4 illustrates an example runtime process of identifying a salient portion of an image for autocropping using the example server of FIG. 2.

FIG. 4 illustrates an example runtime process 400 of identifying a salient portion of an image for autocropping using the example server of FIG. 2. While FIG. 4A is described with reference to FIG. 2, it should be noted that the process steps of FIG. 4A may be performed by other systems.

The process 400 relates to a workflow for autocropping with multiple aspects. For example, the process 400 describes a process of finding crops of an image that are suitable for various media platforms. An example of this is in a supplied image where different social media platforms allow you to post images to an activity feed with specific aspect ratios. The process 400 can automatically select an interesting region of the image to crop based on a convolutional neural network trained on behavioral data of users downloading images from queries.

The process 400 begins by proceeding from start step to step 401 where an example image is provided to a trained convolutional neural network that determines a saliency of each pixel in the example image with respect to an overall scene of the example image, as defined as the learned regions of an image that best enable a computer vision model (e.g., the convolutional neural network 240) to categorize an image.

Next, in step 402, the trained convolutional neural network generates a saliency map of the example image. The saliency map may be a mapping where each pixel has an associated value with its particular saliency value, in which the saliency value of a pixel may be the normalized attention that the pixel has in the overall scene. With the saliency map at a per-pixel level, an integral image can be constructed.

Subsequently, in step 403, the subject system determines an integral image of the example image from the saliency map. In one or more implementations, each pixel value of the integral image is different from that of the example image based on the saliency map. In this respect, the value of a pixel in the integral image can be expressed as:

$$p(x,y)=s(x,y)+p(x-1,y)+p(x,y-1),$$

where s(x,y) is the saliency of the image at the specified location. The integral image may allow computation of the sum of all of the saliency pixels over a specified region in constant time.

Next, in step 404, for each fixed region with a predetermined aspect ratio within the example image, the subject system determines a sum of saliency for the fixed region based on the integral image. For example, for each aspect ratio in search of a crop, a bounding box with a specified aspect ratio may be incrementally shifted over the integral image. The bounding box may be defined by an overlay layer over the integral image, such that the image content inside the bounding box defines the crop. The bounding box may correspond to one of a plurality of predetermined aspect ratios (e.g., 1200×1200, 1200×627, 851×315, 1080×1080, 1024×512, 1500×1500, etc.) associated with multiple social media platforms. The summed area within the bounding box may be recorded (or stored), and the maximum sum of saliency for all valid boxes within the image (i.e., each of the incrementally shifted boxes). In this respect, the bounding box that contains the maximum sum defines the bounds for the crop.

In step 405, the subject system modifies the example image by cropping a region of the example image that corresponds to the fixed region having a maximum sum of saliency. In this respect, the region of the example image is cropped to one of a plurality of predetermined aspect ratios. The cropped image can then be provided as part of a listing of search results, where the cropped image indicates a salient region (or object) of the corresponding example image.

Figure 5A:
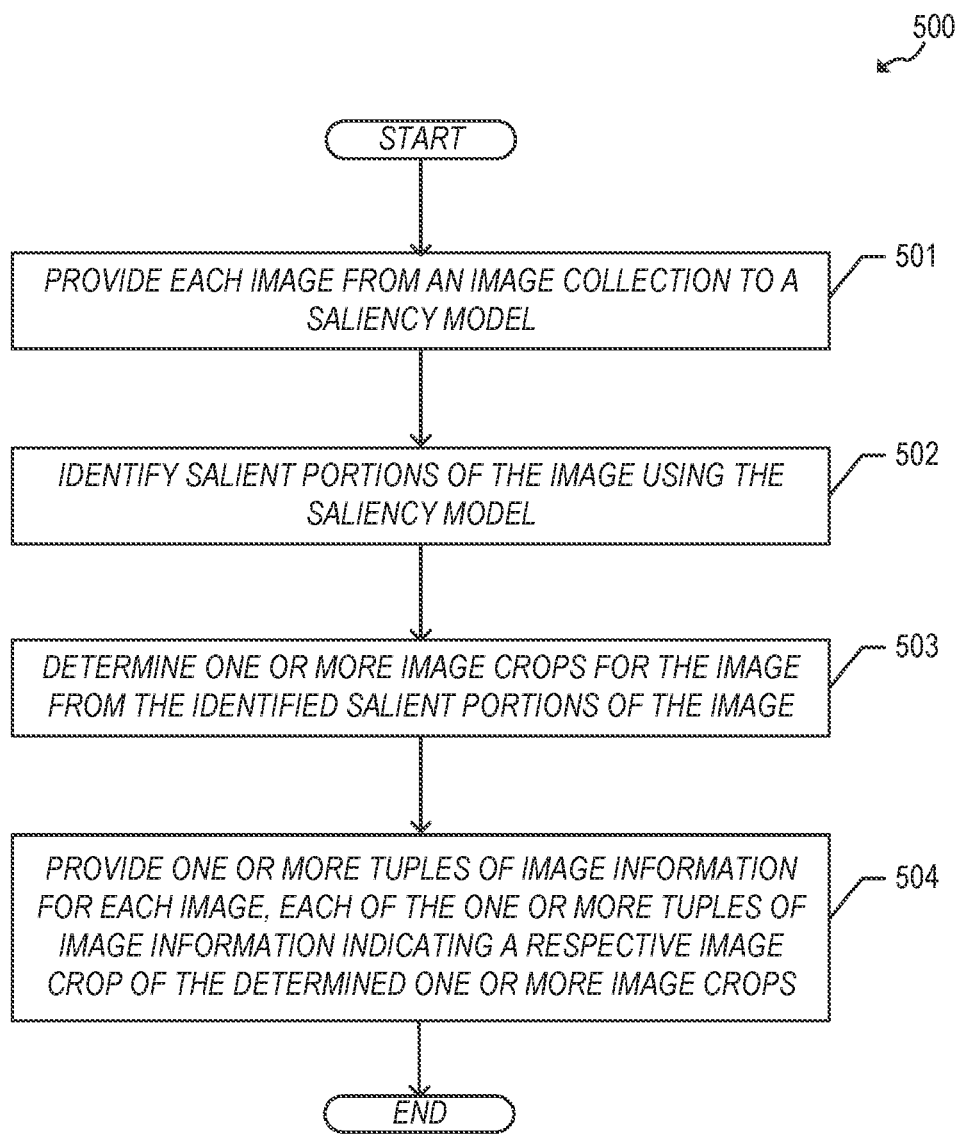
FIG. 5A illustrates an example offline process of identifying relevant image crops for indexing using the example server of FIG. 2.

FIG. 5A illustrates an example offline process 500 of identifying relevant image crops for indexing using the example server of FIG. 2. While FIG. 5A is described with reference to FIG. 2, it should be noted that the process steps of FIG. 5A may be performed by other systems.

The process 500 begins by proceeding from start step to step 501 where each image from an image collection is provided to a trained saliency model that determines a saliency of each pixel in the image with respect to an overall scene of the image. In one or more implementations, the trained saliency model includes a trained convolutional neural network (e.g., 240), where an output layer of the neural network provides a probability indicating a likelihood that a pixel (or a set of pixels) within an image is salient.

Next, in step 502, the trained saliency model identifies the most salient portions of the image. Subsequently, in step 503, the subject system determines one or more image crops for the image from the identified salient portions of the image. In one or more implementations, the trained saliency model potentially identifies more than one crop per image.

In step 504, the subject system provides one or more tuples of image information for each image. In one or more implementations, each of the one or more tuples of image information indicates a respective image crop from the determined one or more image crops. In one or more implementations, a tuple of image information includes an image identifier, a tag or label indicating an image crop for the image, and coordinates of the image crop within the image. The image identifier may be a unique identifier for the image. The crop tag may be a textual description of the object in the crop, e.g., "woman" or "beach towel." The coordinates x1, y1 may be the upper-left coordinates of a bounding box for the crop, while x2, y2 are the lower-right coordinates of the bounding box.

Figure 5B:
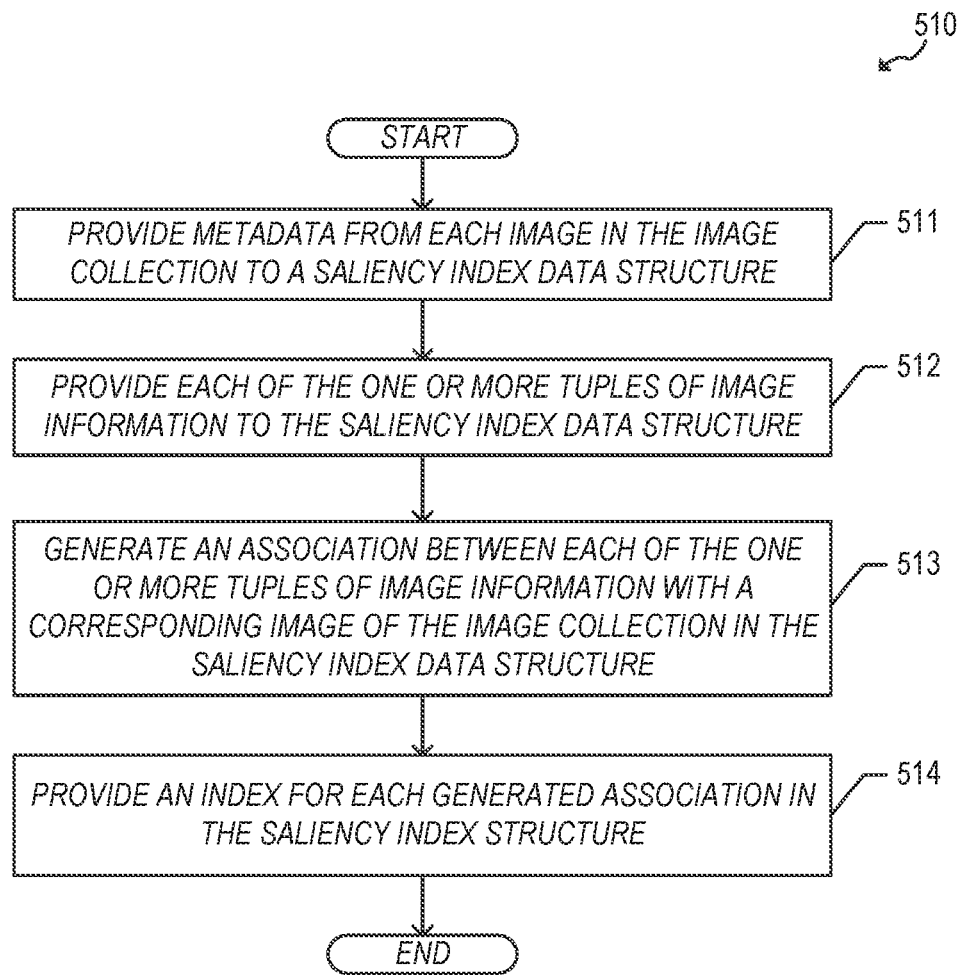
FIG. 5B illustrates an example offline process of generating a search index of relevant image crops using the example server of FIG. 2.

FIG. 5B illustrates an example offline process 510 of generating a search index of relevant image crops using the example server of FIG. 2. While FIG. 5B is described with reference to FIG. 2, it should be noted that the process steps of FIG. 5B may be performed by other systems. Indexing crops of images directly into a search index and returning them along with standard search results can help transform an image that is marginally relevant into an image that is significantly more relevant (e.g., for the query "dog," a crop of only the dog would be more relevant than an original image that contains a man, a woman and a dog).

The process 500 begins by proceeding from start step to step 511 where metadata from each image in the image collection is provided to a saliency index data structure. For example, image data and metadata (e.g., image identifier, keywords, etc.) are passed into the saliency index data structure.

Next, in step 512, each of the one or more tuples of image information is provided to the saliency index data structure. The crop tag may be a dedicated field used for boosting an the coordinates may be stored for the purpose of later rendering thumbnails of the original image around the crops. Subsequently, in step 513, the subject system generates an association between each of the one or more tuples of image information with a corresponding image of the image collection in the saliency index data structure. In step 514, the subject system provides an index for each generated association in the saliency index data structure.

Figure 5C:
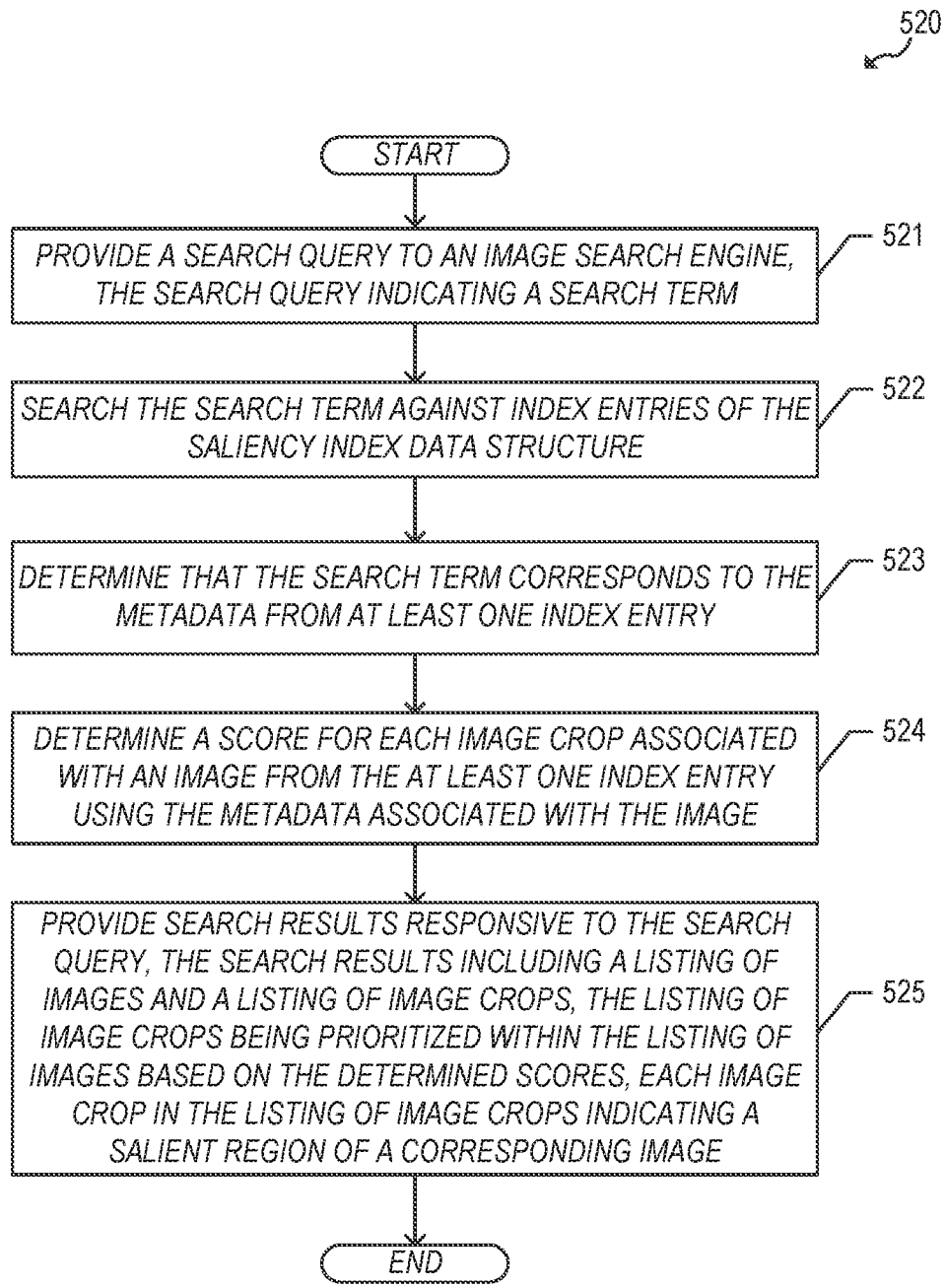
FIG. 5C illustrates an example runtime process of generating search results based on the search index of relevant image crops using the example server of FIG. 2.

FIG. 5C illustrates an example runtime process 520 of generating search results based on the search index of relevant image crops using the example server of FIG. 2. While FIG. 5C is described with reference to FIG. 2, it should be noted that the process steps of FIG. 5C may be performed by other systems.

The process 520 begins by proceeding from start step to step 521 where a search query is provided to an image search engine at runtime. In one or more implementations, the search query indicates one or more search terms or phrases. Next, in step 522, the subject system searches a search term from the search query against index entries of the saliency index data structure. In one or more implementations, the subject system determines whether textual fields of the search query match the metadata of a standard size image and the crop tag field extracted from the tuples of image information. Subsequently, in step 523, the subject system determines that the search term corresponds to the metadata from at least one index entry.

Next, in step 524, the subject system determines a score for each image crop associated with an image from the at least one index entry using the metadata associated with the image. In one or more implementations, each image crop contains a salient region of a corresponding image. In one or more implementations, the crop tag field may include an associated weight that is tunable based on behavioral data (e.g., the user interaction data 254). In one or more implementations, the score for an image crop is expressed as crop_informed_score=original IR score+ w_1*crop_tag_score, where crop_tag_score is zero if the search query does not textually match the indexed image crop field value, and w_1 is the weight value associated with the image crop. If the crop_tag_score does match the image crop field value, then w_1 captures the extent to which the image search engine 242 prioritizes crop matches.

In step 525, the subject system provides search results responsive to the search query. In one or more implementations, the search results mix a listing of images and a listing of image crops. In one or more implementations, when displaying the search results, if the search result is a crop, as opposed to a full image (i.e., originally-sized image), the stored coordinates (e.g., (x1, y1), (x2, y2)) are used to render a dynamically generated thumbnail for the cropped portion of the image.

In one or more implementations, the listing of image crops is prioritized within the listing of images based on the determined scores, depending on the overall score of each image and crop (e.g., sorting by the crop_informed_score). It is possible as an extension to improve ranking relevancy further by learning which queries are most likely to benefit from showing crops. As an example, queries likely to result in images containing people in them ("woman", "family") may benefit more from the inclusion of relevant crops than queries such as "abstract background," where the entire image is either tessellated or fails to have meaning when cropped. In the expression (1) shown above, w_1 can be replaced by w=f(query), a function of the specific query. This mapping can be learned by mining logs (e.g., session logs) and extracting proportions of users interacting in a positive way (e.g. clicking or downloading) with crops in the search results. In one or more implementations, the variable 'w' may be a ratio of images downloaded for a query that are crops to the count of all images downloaded for the query.

Figure 6:
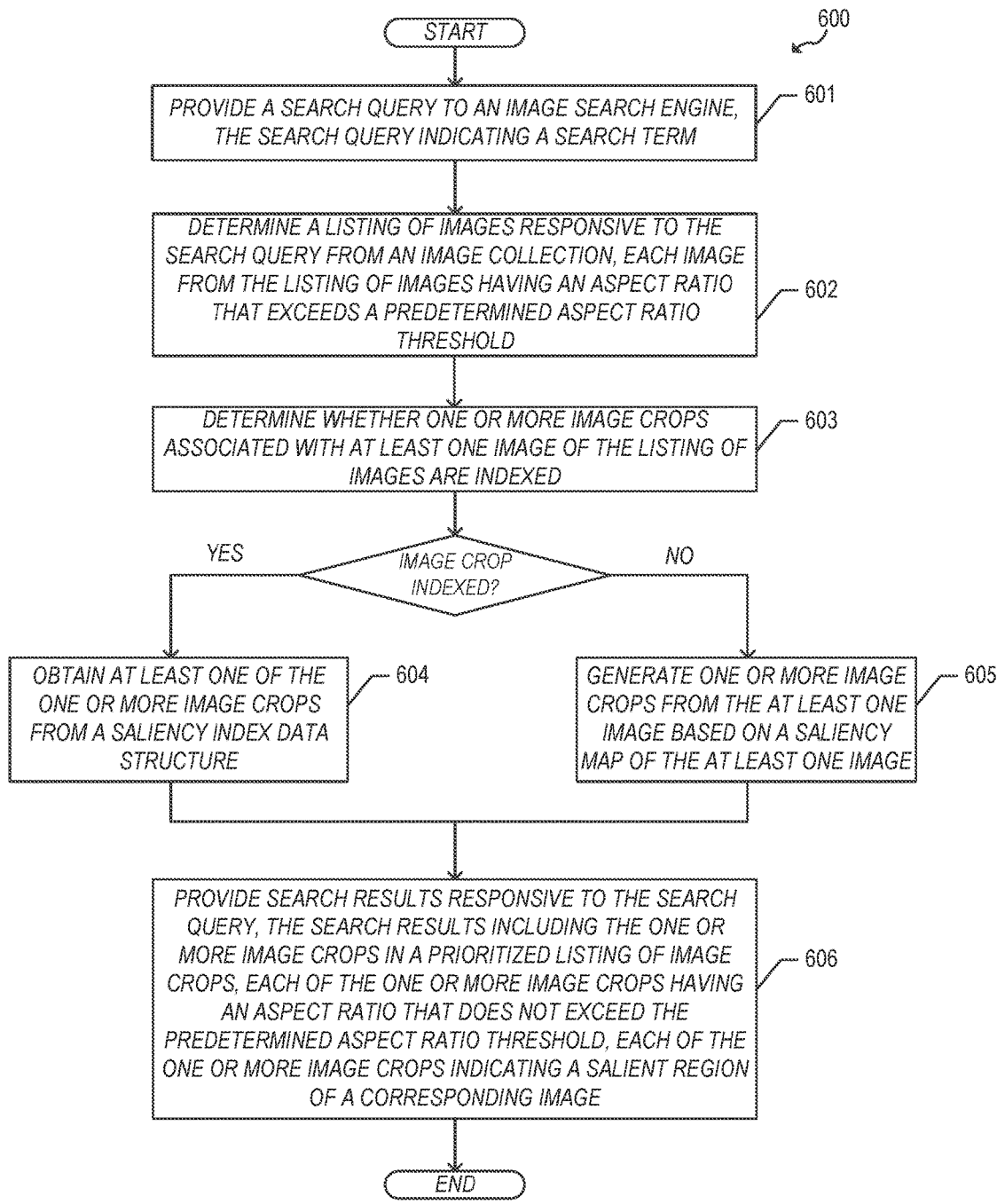
FIG. 6 illustrates an example runtime process of providing image crops of a certain aspect ratio for search results using the example server of FIG. 2.

FIG. 6 illustrates an example runtime process 600 of providing image crops of a certain aspect ratio for search results using the example server of FIG. 2. While FIG. 6 is described with reference to FIG. 2, it should be noted that the process steps of FIG. 6 may be performed by other systems.

In traditional IR systems, images that are much wider than they are tall (e.g., panoramic aspect ratio) gain additional real estate in a search results display. The search results display may include a mosaic-based layout but the search results display may be in a different layout depending on implementation. This has both the effect of biasing user behavior, as well as reducing the effective number of images that are visible "above the fold." The disclosed system can standardize a fixed crop size, or a maximum envelope, to prevent such panoramic aspect ratios.

The process 600 begins by proceeding from start step to step 601 where a search query is provided to an image search engine. In one or more implementations, the search query indicates a search term. Next, in step 602, the subject system determines a listing of images responsive to the search query from an image collection. In one or more implementations, each image from the listing of images has an aspect ratio that exceeds a predetermined aspect ratio threshold. For example, the predetermined aspect ratio threshold may correspond to a 4:3 aspect ratio. In this example, an image that has a 16:9 aspect ratio would be deemed to have exceeded the predetermined aspect ratio threshold set to 4:3. The predetermined aspect ratio threshold may correspond to any arbitrary aspect ratio value depending on implementation.

Subsequently, in step 603, the subject system determines whether one or more image crops associated with at least one image of the listing of images are indexed. If the subject system determines that one or more images are indexed, then the process 600 proceeds to step 604. Otherwise, the process 600 proceeds to step 605. In step 604, the subject system obtains at least one of the one or more image crops from a saliency index data structure when the subject system determines that one or more image crops associated with the at least one image are indexed. In step 605, the subject system determines one or more image crops for the at least one image based on a saliency map of the at least one image when the subject system determines that one or more image crops associated with the at least one image are not indexed.

Subsequently, in step 606, the subject system provides search results responsive to the search query. In one or more implementations, the search results include the one or more image crops in a prioritized listing of image crops. In one or more implementations, each of the one or more image crops has an aspect ratio that does not exceed the predetermined aspect ratio threshold. In one or more implementations, each of the one or more image crops contain a salient region of a corresponding image. Storing the crop bounds reduces the amount of resources required from a computational standpoint as opposed to re-computing the crop at retrieval time.

Figure 7:
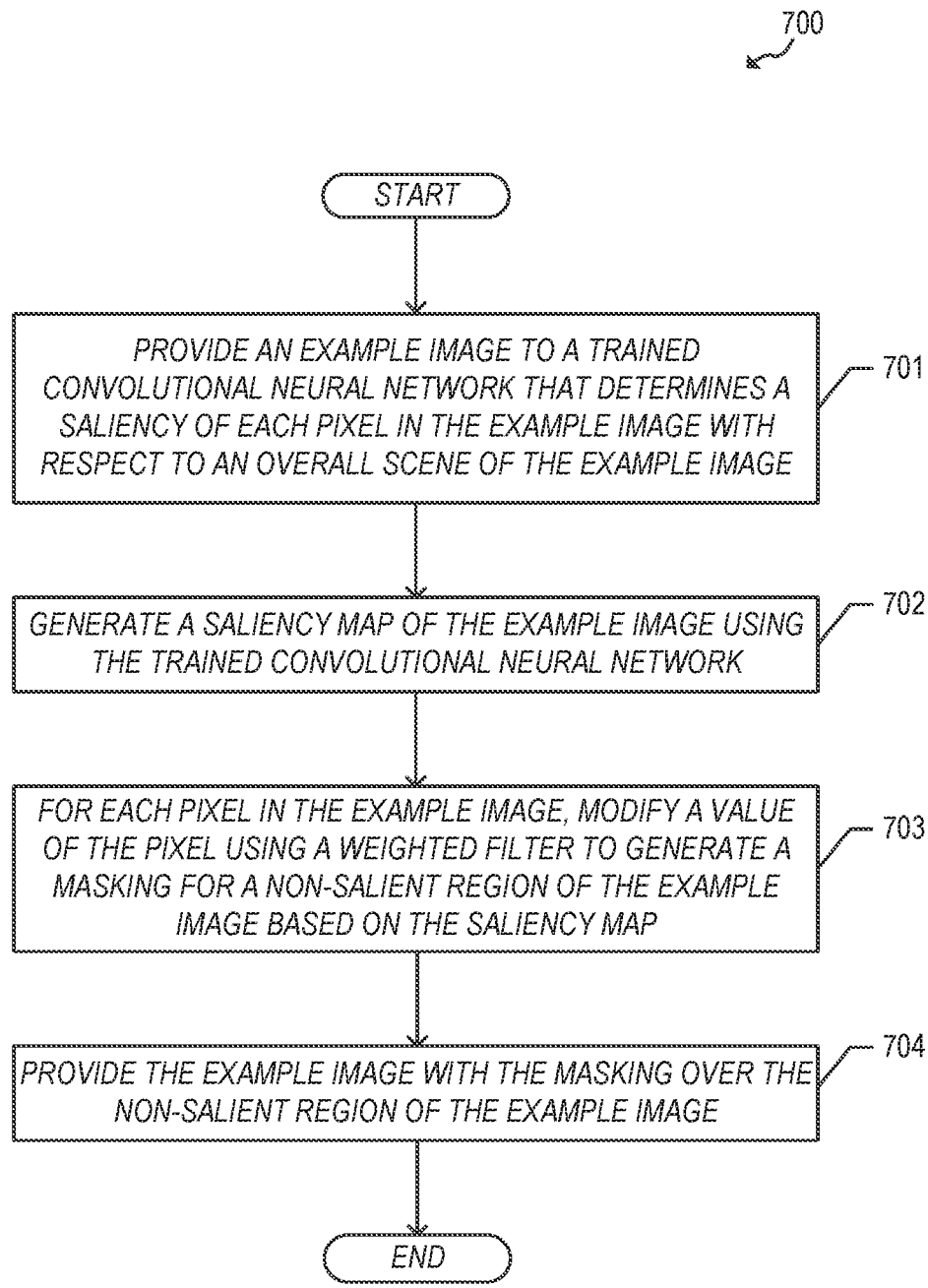
FIG. 7 illustrates an example runtime process of masking a non-salient portion of an image using the example server of FIG. 2.

FIG. 7 illustrates an example runtime process 700 of masking a non-salient portion of an image using the example server of FIG. 2. While FIG. 7 is described with reference to FIG. 2, it should be noted that the process steps of FIG. 7 may be performed by other systems.

The process 700 begins by proceeding from start step 701 where an example image is provided to a trained convolutional neural network that determines a saliency of each pixel in the example image with respect to an overall scene of the example image. The determined saliency can be used to embellish parts of an image. The saliency indicates where the important aspects of an image are located, and the search query can be indicative to determine where an interesting portion of an image may be located. Next, in step 702, the trained convolutional neural network generates a saliency map of the example image.

Subsequently, in step 703, for each pixel in the example image, the subject system modifies a value of the pixel using a weighted filter to generate a masking for a non-salient region of the example image based on the saliency map. In this respect, the value of a pixel in the modified image can be expressed as:

$$p(x,y)=s(x,y)p(x,y)+(1-s(x,y))f(x,y),$$

where f(x,y) is a weighted blend of neighboring pixels, such as a Gaussian blur filter.

In step 704, the subject system provides the example image with the masking over the non-salient region of the example image.

Figure 8:
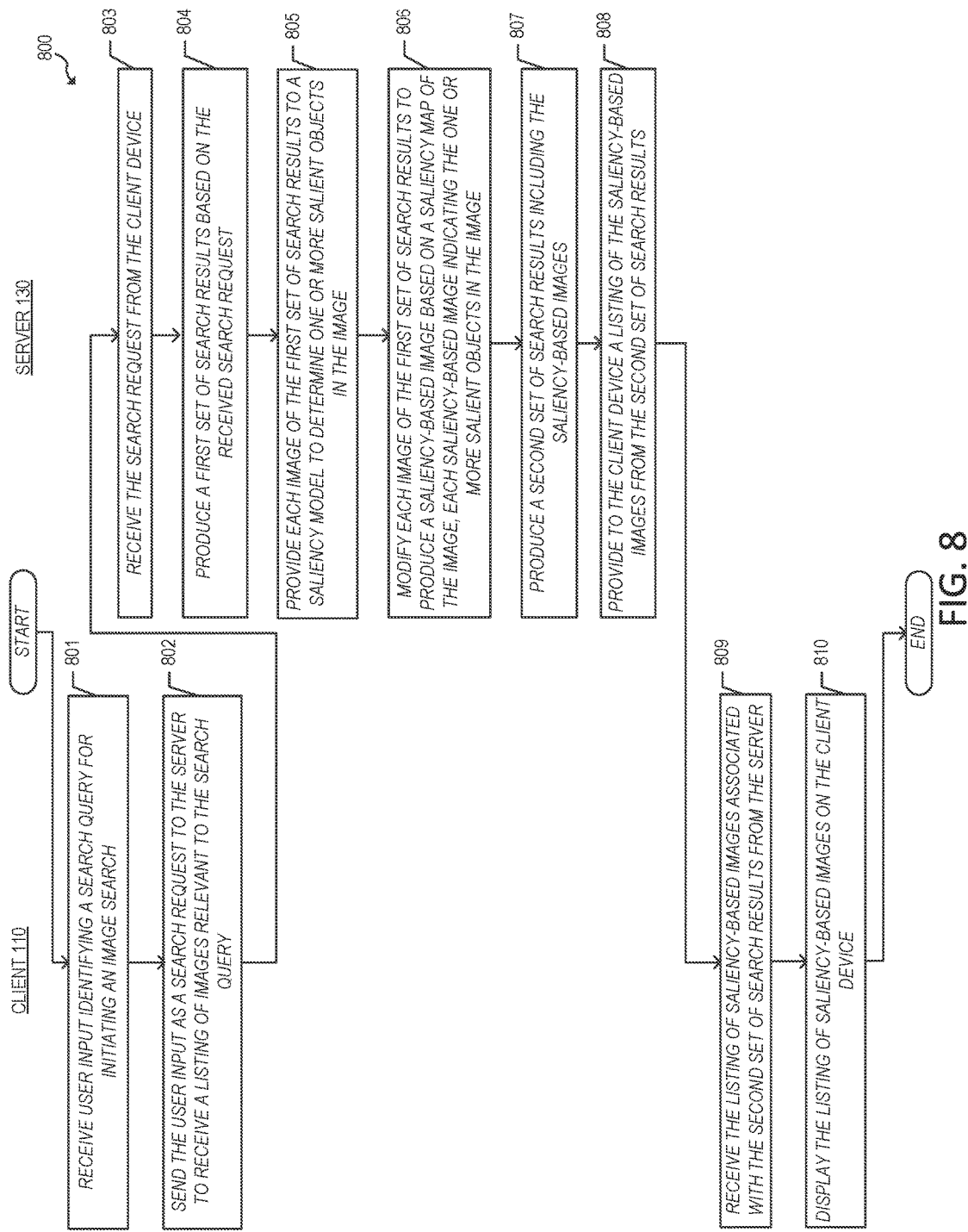
FIG. 8 illustrates an example process for content search by identification of a salient portion of an image using the example client and server of FIG. 2.

FIG. 8 illustrates an example process 800 for content search by identification of a salient portion of an image using the example client and server of FIG. 2. The process 800 begins in step 801 when a user, for example, loads an application 222 on a client 110 and the client 110 receives an input from the user using the input device 216 for a search query to initiate an image search through a collection of images 252. The input identifies one or more search terms in a given natural language for initiating the image search. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms as part of a text-based search query via a user interface of the application 222.

Next, in step 802, the application 222 on the client 110 sends the user input as a search request to the server 130 in order to receive a listing of images responsive to the text-based search query. Turning to the server 130, in step 803, the server 130 receives the search request for a listing of images from the client 110.

Subsequently, in step 804, the server 130 produces a first set of search results based on the received search request. For example, the search query (or request) may indicate a search term "beach," and hence, the server 130 may determine an image identifier associated with the search term "beach." In one or more implementations, the server 130 determines a collection of images associated with the one or more image identifiers. For example, the image identifier may be associated with a cluster of images that contain content relevant to the search term "beach."

Next, in step 805, the server 130 provides each image of the first set of search results to a saliency model to determine one or more salient objects in the image. Subsequently, in step 806, the server 130 modifies each image of the first set of search results to produce a saliency-based image based on a saliency map of the image. In one or more implementations, each saliency-based image indicates the one or more salient objects in the image. In step 807, the server 130 produces a second set of search results including the saliency-based images.

Next, in step 808, the server 130 provides to the client 110 a listing of the saliency-based images from the second set of search results. Turning back to the client 110, in step 809, the client 110 receives the listing of saliency-based images associated with the second set of search results from the server 130. Next, in step 810, the listing of saliency-based images is provided for display via the application 222 of the client 110.

Figure 9:
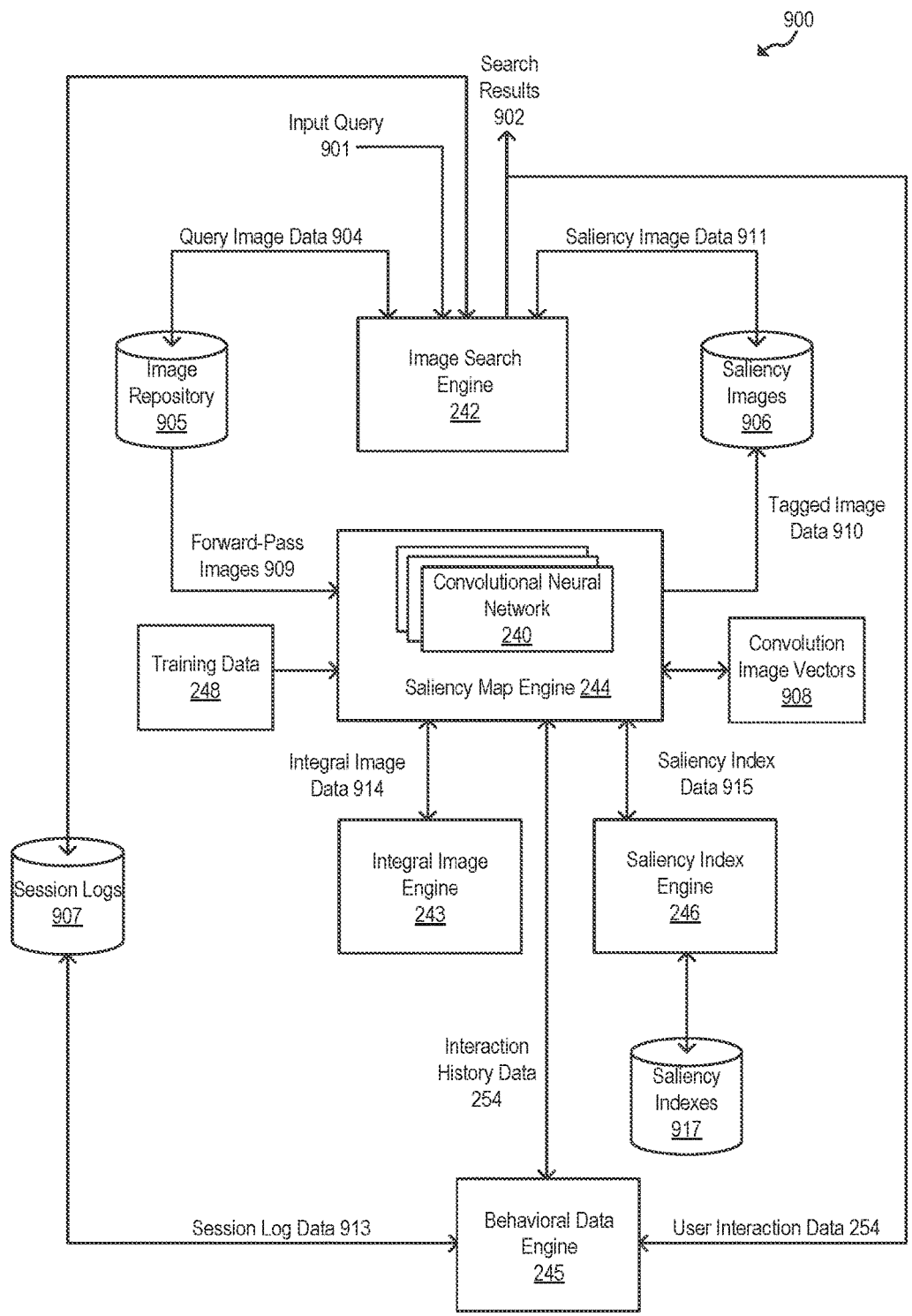
FIG. 9 illustrates a schematic diagram of an example architecture suitable for practicing the example process of FIG. 8.

FIG. 9 illustrates a schematic diagram of an example architecture suitable for practicing the example process of FIG. 8. In FIG. 9, the architecture 900 provides for an input search query to search for images that map, or at least in part, to a term or phrase in the input search query for retrieving a set of images relevant to the input search query.

The processor 236, using the saliency map engine 244, determines salient objects and/or salient regions in each image using the forward-pass images 909 from the image repository 905. The images processed through the saliency map engine 244 are then provided as tagged image data 910 to a saliency images repository 906. The tagged image data 910 may indicate a probability that an object or region within an image is salient for each example image. The tagged image data 910 from the saliency map engine 244 may include metadata for association with the example image in the image repository 905. The metadata may include an image identifier and/or the probability for a corresponding salient object (or pixel). The tagged image data 910 from the trained saliency map engine 244 may be stored in an image repository where salience-based images are stored separately from the image repository 905 (e.g., 906) or stored as part of the image repository 905 depending on implementation. The operation of building an image search space (e.g., the collection of images 252) may be performed recursively in a closed loop until a set of example images, for a given object class and/or a set of object classes, includes a range of images with varying degrees of salient objects and recognition accuracy.

In one or more implementations, the processor 236, using the saliency map engine 244 and integral image engine 243, performs autocropping by: (1) identifying one or more image crops, with various sizes, from a given image to optimize the preserved content when downsizing a large image, e.g. choosing an image crop of a particular required size for the inclusion in a web page; (2) supplementing an image collection with additional image crops that are deemed relevant, allowing for increased relevancy in a set of image search results while simultaneously minimizing required post processing; (3) providing an enhanced mosaic layout that auto crops the most salient portion of an image for display, thus optimizing signal to noise ratio in available pixel real estate when displaying thumbnails in a search result display, and (4) providing automatic visual embellishment of an image to focus attention on the most salient region of the image. In one or more implementations, the processor 236, using the saliency index engine 246, indexes crops of images directly into a saliency indexes repository 917 (e.g., saliency index data structure) to allow the crops of images to be returned along with the search results 902.

In training the convolutional neural network 240 to recognize objects in an image, the processor 236 submits a plurality of training images (e.g., set of training data 248) to the convolutional neural network 240 that is configured to analyze pixel data for each of the plurality of training images to identify features in each of the plurality of training images. The convolutional neural network 240, running an object class training algorithm, processes the different images in the set of training data 248 to learn to identify features in the images that correspond to an object class. In one or more implementations, the convolutional neural network 240 is trained to recognize the amount of saliency in a region or an object within the image by contrasting the pixels within the considered region (or object) to the surrounding pixels. In one or more implementations, the set of training data 248 includes multiple sets of training images, where each set of training images corresponds to one particular object class with positive instances of the object class. In this respect, the convolutional neural network 240 extracts features and transforms these features into a feature descriptor vector for mapping to an object class that corresponds to the particular set of training images. In this example, each object class may have its own convolutional neural network. In this respect, weights in a respective convolutional neural network 240 are trained during the training phase, and each of the convolutional neural networks 240 provides processed pixel data as convolution image vectors 908.

The processor 236, using the saliency map engine 244, composed of multiple object classifiers (e.g., a series of convolutional neural networks), feeds image pixel data for forward-pass images 909, from the collection of images 252, through a number of object classifiers. For each image, the saliency map engine 244 produces multiple saliency probabilities using a number of object classifiers. In some embodiments, the process of generating a saliency probability from each of the object classifiers may be performed in parallel of one another. Each of the saliency probability values may indicate the likelihood that a region or object within the image is salient. The saliency probabilities may be aggregated into a probability distribution array. In one or more implementations, the probability distribution array represents a two-dimensional probability waveform, where the x-dimension refers to the compiled object classes and the y-dimension refers to probability values (e.g., 0.0 to 1.0) corresponding to the respective saliency.

In a runtime session, the processor 236 of the server 130 is configured to receive an input query 901 from a user. The input query 901 identifies one or more search terms for initiating an image search. Upon receiving the input query 901, the processor 236, using the image search engine 242, submits the input query 901 to index the image repository 905 using query image data 904.

In turn, the processor 236 then receives an identification of a plurality of images from the collection of images 252 that are responsive to the input query 901. The collection of images 252 may be stored in the image repository 905 accessible to the server 130. In one aspect, the plurality of images are tagged with an image identifier along with the pixel data of the image. In one or more implementations, the processor 236, using the image search engine 242, obtains image metadata through the query image data 904 from the image repository 905.

In one or more implementations, the image search engine 242 returns images (e.g., 902) obtained through the saliency image data 911 from the saliency images repository 906. In this respect, the search results 902 include a mix of images along with a listing of image crops obtained through the saliency image data 911. In one or more implementations, the processor 236 provides the search results 902 with a ranking according to a proportion that the user desires to retrieve more or less relevant content. The processor 236 may provide the ranked search results 902 to the application 222 on the client 110 over the network 150 for display by an output device 214 of the client 110.

In one or more implementations, the processor 236, using the image search engine 242, may obtain an image identifier that corresponds to the input query 901. For example, the input query 901 may include a search term "beach" such that the image identifier associated with the search term "beach" is used to index the image repository 905. In this respect, a cluster of images that is relevant to the search term "beach" are indexed. Among the cluster of images, a subset of object classes corresponding to the query search term may be identified. The processor 236, using the image search engine 242, may filter images corresponding to the identified object classes. In turn, the filtered images are then provided as part of the search results 902. In one or more implementations, the processor 236, using the saliency map engine 244, generates crops of the images for inclusion into the search results 902, where each crop indicates a salient region or object within the image.

The processor 236, using the image search engine 243 and the behavioral data engine 245, receives user interaction data 254 indicating feedback with respect to one or more images in the listing of search results. In one or more implementations, the interaction data 254 may be stored in the session logs 907 as the session log data 913. In one or more implementations, weights may be applied to the interaction data 254. A weight value may be applied to one image crop. For example, a certain weight may represent that a certain salient object in the image is highly likely more consistent to what the user intended in the search query. In some aspects, the weights assigned to each of the image crops may be adjustable by a user preference setting. In one or more implementations, the weight values may be applied to search results generated by the image search engine 242 to influence the prioritization of the search results toward the non-cropped images or toward the cropped images.

In one or more implementations, the behavioral data engine 245 provides user interaction data 254 to the saliency map engine 244 to facilitate any further training of the convolutional neural network 240 by supplying user information that indicates which images with certain features are more likely to be selected or interacted with for a given search query during a runtime operation. In turn, the convolution neural network 240 may have its weights adjusted to increase the amount of accuracy in recognizing objects within images. In one or more implementations, the interaction data 254 can be used to find the most relevant search results from the image search engine 242. For example, output from the behavioral data engine 245 based on the interaction data 254 may be input back into the image search engine 242 via the session logs 907 to produce a more precise listing of search results.

Figure 10:
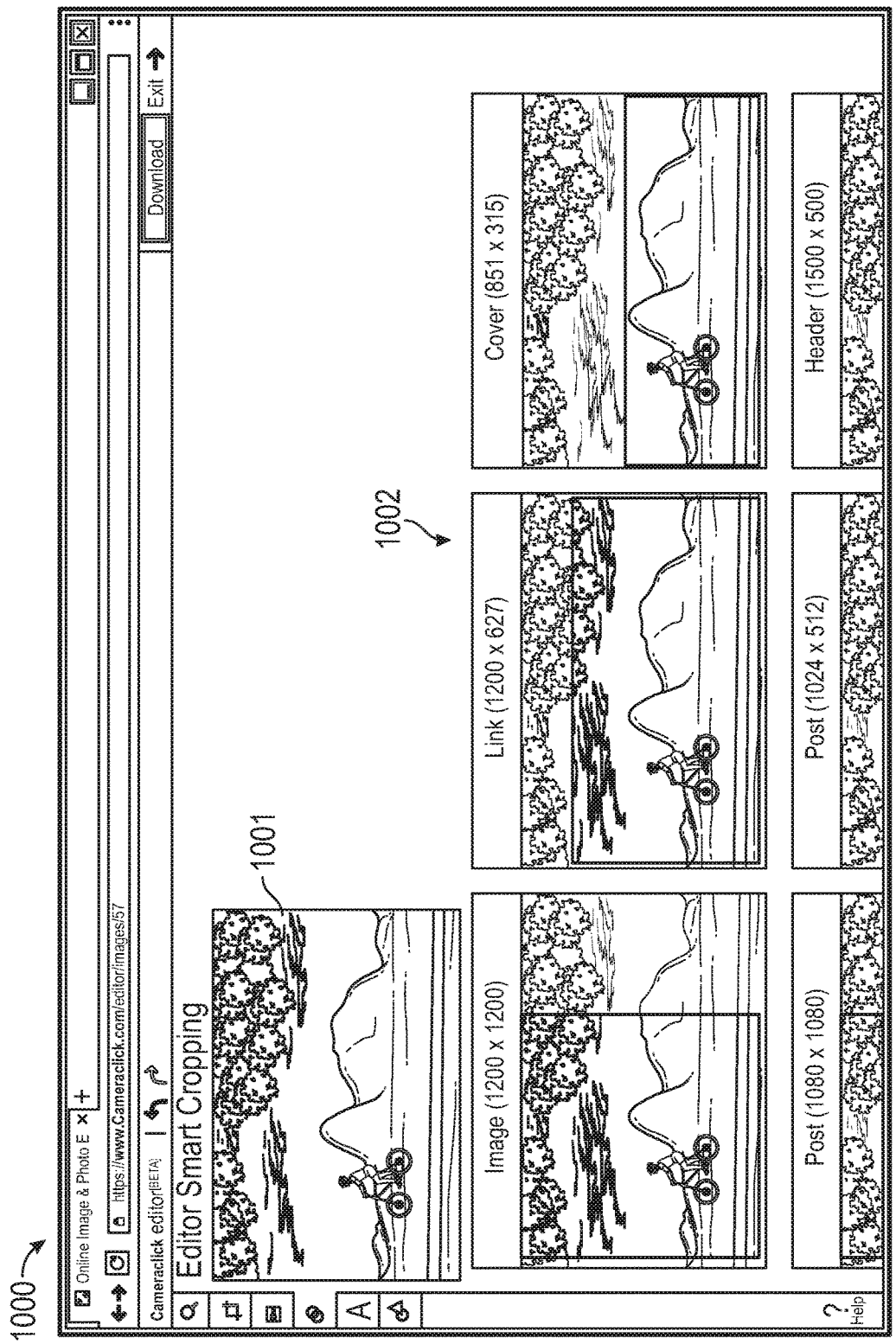
FIG. 10 illustrates an example of a user interface for practicing the example process of FIG. 4.

FIG. 10 illustrates an example of a user interface 1000 for practicing the example process of FIG. 4 via the application 222 of the client 110. The user interface 1000 relates to a workflow for autocropping with multiple aspects. For example, the user interface 1000 describes a process of finding crops of an image that are suitable for various media platforms. An example of this is in a supplied image (e.g., 1001) where different social media platforms allow you to post images to an activity feed with specific aspect ratios. For example, a user, via the user interface 1000, can automatically select an interesting region of the image 1001 to crop based on a convolutional neural network trained on behavioral data of users downloading images from queries.

In FIG. 10, the user interface 1000 provides for display an example image (e.g., 1001) that is provided to the saliency map engine 244 that determines a saliency of each pixel in the example image with respect to an overall scene of the example image 1001, as defined as the learned regions of an image that best enable a computer vision model (e.g., the convolutional neural network 240) to categorize an image. The saliency map engine 244 generates a saliency map of the example image 1001 shown in the user interface 1000. With the saliency map at a per-pixel level, an integral image can be constructed. Each pixel value of the integral image may be different from that of the example image based on the saliency map. The integral image may allow computation of the sum of all of the saliency pixels over a specified region in constant time.

The user interface 1000 may provide for display multiple versions of the integral image, where each version corresponds to one of a plurality of predetermined aspect ratios. For each fixed region with a predetermined aspect ratio within the example image, the subject system determines a sum of saliency for the fixed region based on the integral image. For example, for each aspect ratio in search of a crop, the user interface 1000 provides for display a bounding box with a specified aspect ratio may be incrementally shifted over the integral image. The bounding box may be defined by an overlay layer over the integral image, such that the image content inside the bounding box defines the crop. The bounding box may correspond to one of a plurality of predetermined aspect ratios (e.g., 1200×1200, 1200×627, 851×315, 1080×1080, 1024×512, 1500×1500, etc.) associated with multiple social media platforms. The summed area within the bounding box may be recorded (or stored), and the maximum sum of saliency for all valid boxes within the image (i.e., each of the incrementally shifted boxes). In this respect, the bounding box that contains the maximum sum defines the bounds for the crop.

The example image shown in the user interface 1000 may be modified by cropping a region of the example image that corresponds to the fixed region having a maximum sum of saliency. In this respect, the region of the example image is cropped to one of a plurality of predetermined aspect ratios. The cropped image can then be provided as part of a listing of search results, where the cropped image indicates a salient region (or object) of the corresponding example image.

Figure 11:
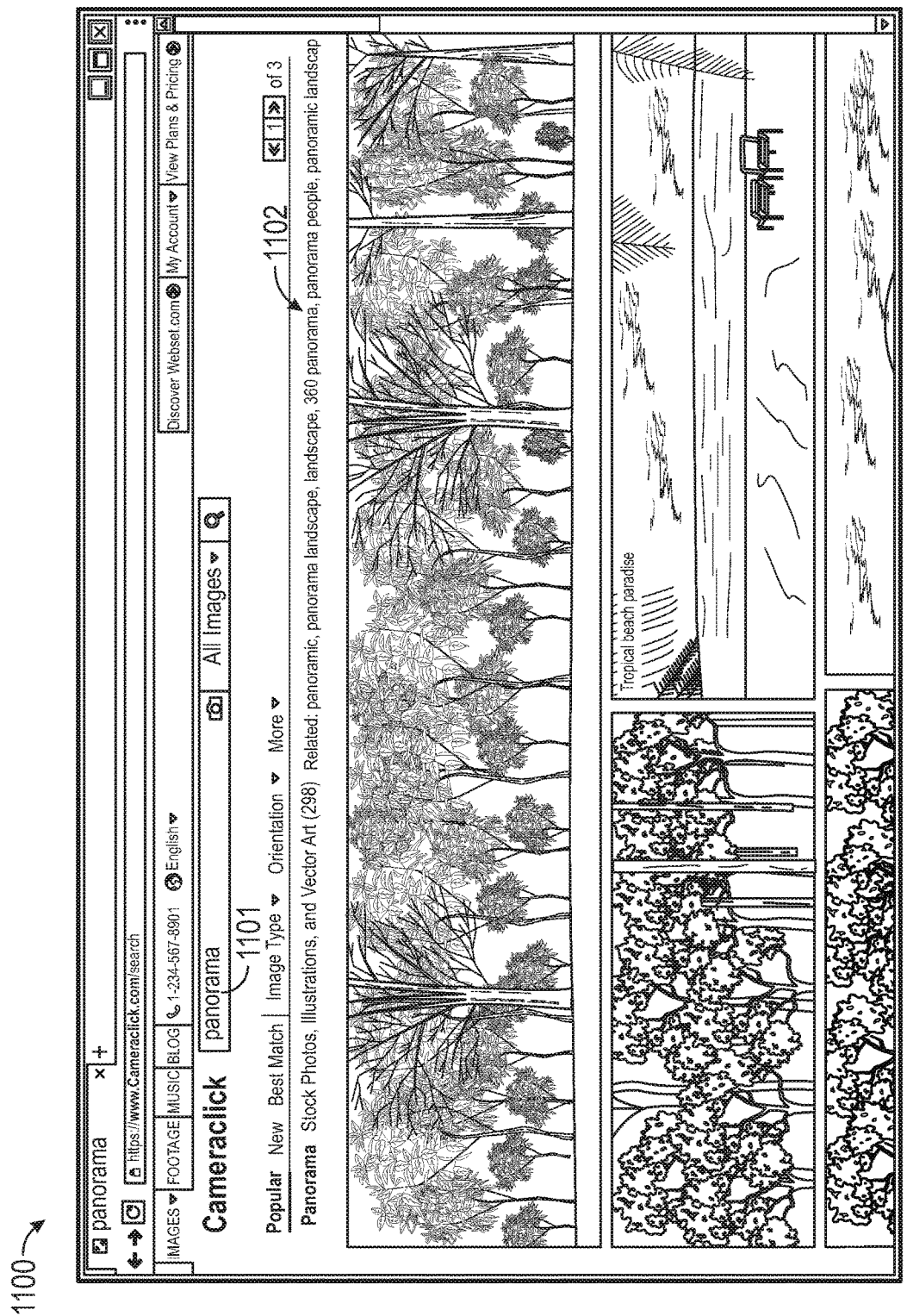
FIG. 11 illustrates an example of a user interface for practicing the example process of FIG. 6.

FIG. 11 illustrates an example of a user interface for practicing the example process of FIG. 6 via the application 222 of the client 110. In FIG. 11, the user interface 1100 includes a search results display 1102 that includes a mosaic-based layout, but the search results display may be in a different layout depending on implementation. In one or more implementations, the layout may be adjusted in real-time based on user interaction with the layout. The search results display 1102 includes images that are much wider than they are tall (e.g., panoramic aspect ratio), which gains additional real estate in the search results display 1102. This has both the effect of biasing user behavior, as well as reducing the effective number of images that are visible "above the fold." The disclosed system can standardize a fixed crop size, or a maximum envelope, to prevent such panoramic aspect ratios.

The user interface 1100 includes a search query that indicates a search term. In this example, the search term indicates "panorama." In turn, the image search engine 242 returns a listing of images responsive to the search query from an image collection (e.g., 1102). Each image from the listing of images (e.g., 1102) has an aspect ratio that exceeds a predetermined aspect ratio threshold. For example, the predetermined aspect ratio threshold may correspond to a 4:3 aspect ratio. In this example, an image that has a 16:9 aspect ratio would be deemed to have exceeded the predetermined aspect ratio threshold set to 4:3. The predetermined aspect ratio threshold may correspond to any arbitrary aspect ratio value depending on implementation.

The processor 236, using the saliency map engine 244, generates one or more image crops for the at least one image based on a saliency map of the at least one image. In turn, the processor 236, using the image search engine 242 and the saliency map engine 244, returns a new listing of images (not shown) that includes the one or more image crops in a prioritized listing of image crops. In one or more implementations, each of the one or more image crops has an aspect ratio that does not exceed the predetermined aspect ratio threshold. In one or more implementations, each of the one or more image crops contain a salient region of a corresponding image. Storing the crop bounds reduces the amount of resources required from a computational standpoint as opposed to re-computing the crop at retrieval time.

Figure 12A:
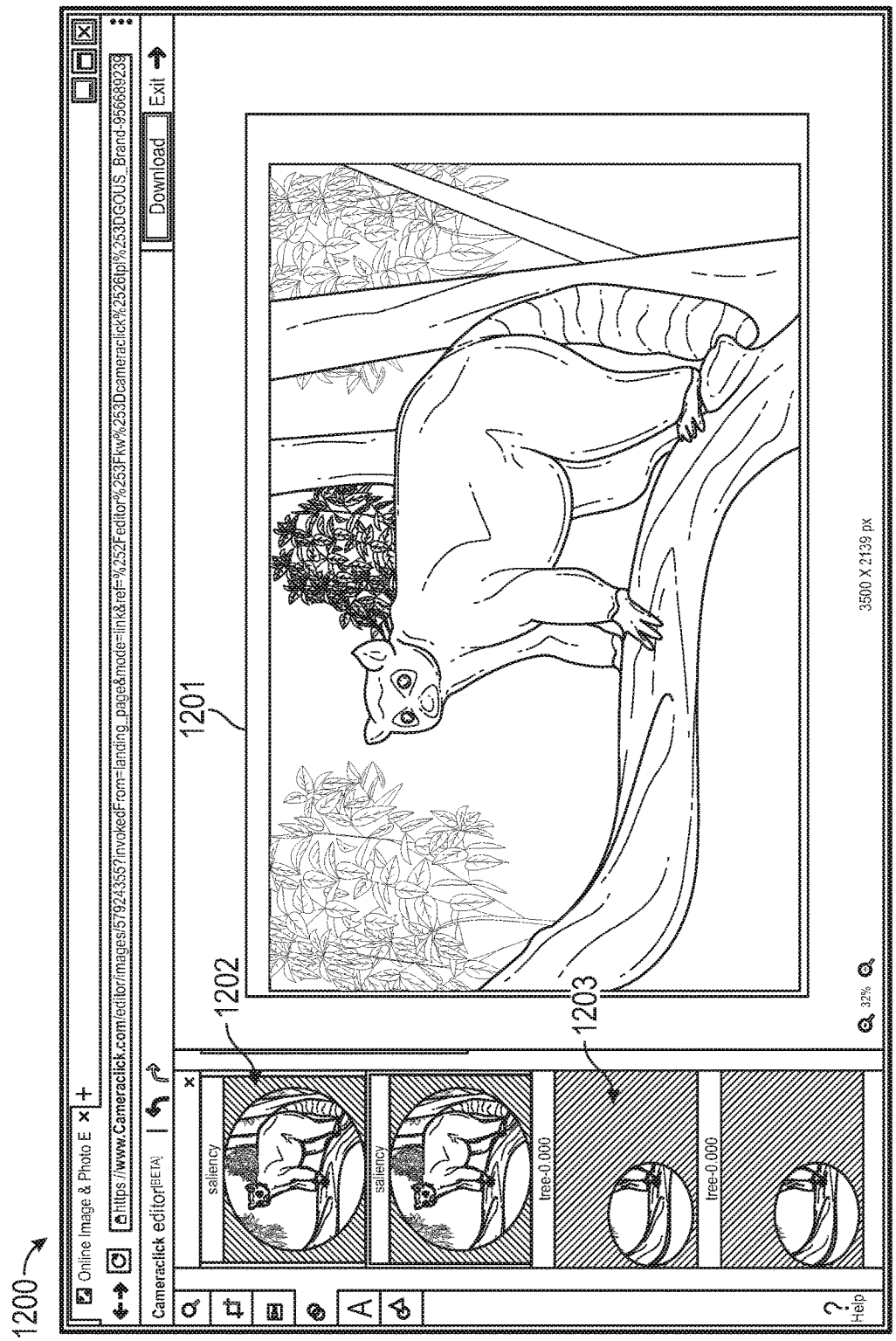
FIGS. 12A and 12B illustrate examples of a user interface for practicing the example process of FIG. 7.

FIG. 12A illustrates an example of a user interface 1200 for practicing the example process of FIG. 7 via the application 222 of the client 110. The user interface 1200 illustrates an example image 1201 that is provided to a trained convolutional neural network that determines a saliency of each pixel in the example image 1201 with respect to an overall scene of the example image. The determined saliency can be used to embellish parts of the example image 1201. The saliency indicates where the important aspects of an image are located, and the search query can be indicative to determine where an interesting portion of an image may be located. The trained convolutional neural network can generate a saliency map of the example image 1201. For each pixel in the example image 1201, the processor 236, using the saliency map engine 244, modifies a value of the pixel using a weighted filter to generate a masking for a non-salient region of the example image 1201 based on the saliency map.

The processor 236, using the saliency map engine 244, provides the example image 1201 with the masking over the non-salient region of the example image 1201. For example, the user interface 1200 includes a modified image 1202, where the masking is applied to pixels surrounding an animal sitting on a tree branch such that the animal is embellished. The user interface 1200 also includes a modified image 1203, where the masking is applied to pixels surrounding the tree branch, thereby darkening the areas that include the animal. In this respect, the non-masked areas refer to regions of the image deemed salient. These images show where the salient regions of the image are by providing blur regions to an image based on how salient they are. This can be useful as both a filter in the mosaic that may help a user find what they like about an image faster by removing extraneous noise, and it also may help with automatically creating copy space in an image for additional content to be added.

Figure 12B:
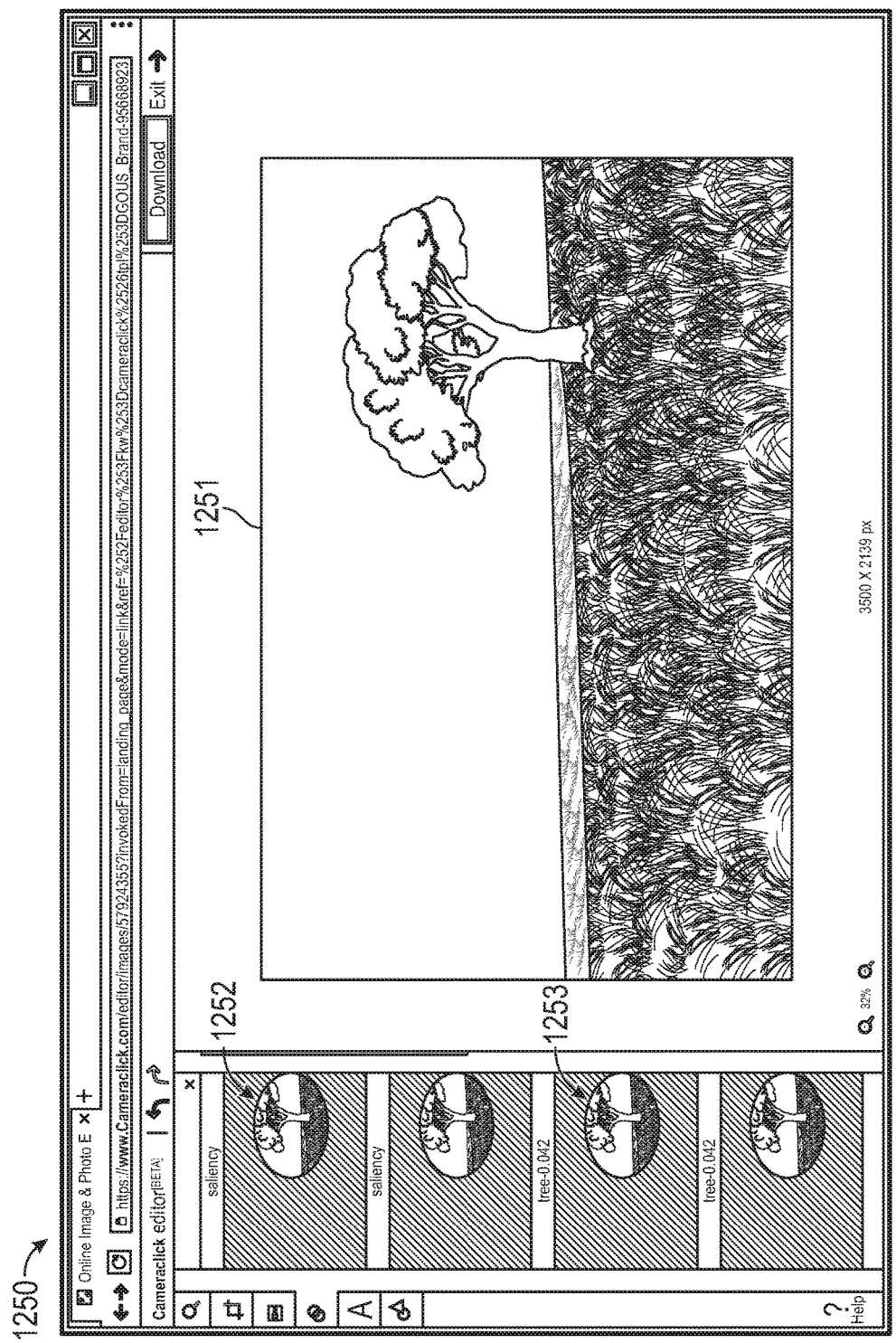

FIG. 12B illustrates an example of a user interface 1250 for practicing the example process of FIG. 7 via the application 222 of the client 110. The user interface 1250 illustrates an example image 1251 that is provided to a trained convolutional neural network that determines a saliency of each pixel in the example image 1251 with respect to an overall scene of the example image 1251. In this example, a query "tree" associated with the example image 1251 maps to an embellishment that is slightly tighter around the object representing the "tree" in a saliency-based image 1253 as opposed to a saliency-based image 1252 associated with a general saliency property. In this respect, if a user searches for "tree", the processor 236, using the saliency map engine 244, embellishes the results, by reducing the contrast or saturation properties on the less important areas and increasing them for the more important areas.

Hardware Overview

Figure 13:
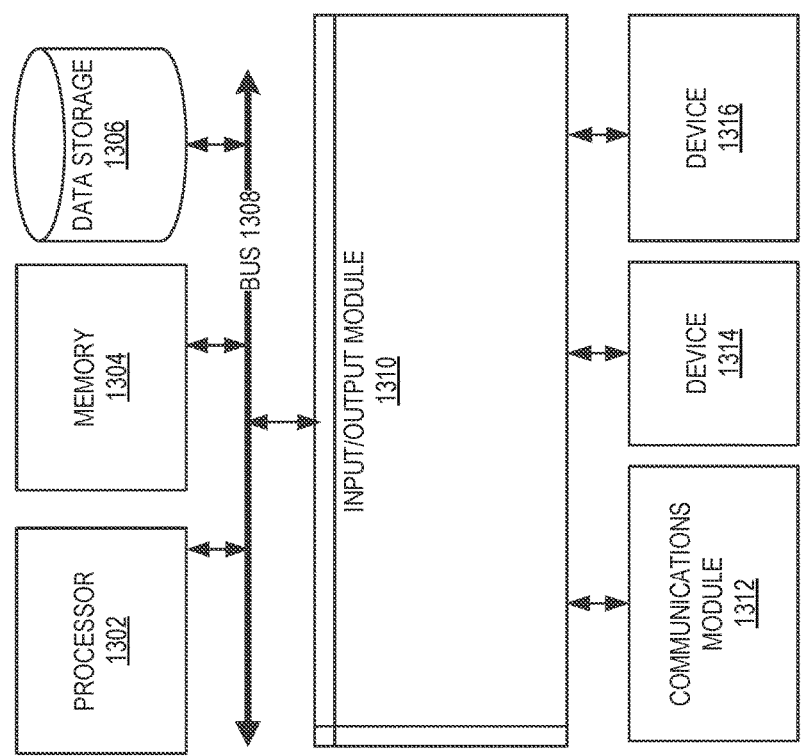
FIG. 13 is a block diagram illustrating an example computer system with which the client and server of FIG. 2 can be implemented.

FIG. 13 is a block diagram illustrating an exemplary computer system 1300 with which the client 110 and server 130 of FIG. 1 can be implemented. In certain aspects, the computer system 1300 may be implemented using hardware or a combination of software and hardware, either in a dedicated server, or integrated into another entity, or distributed across multiple entities.

Computer system 1300 (e.g., client 110 and server 130) includes a bus 1308 or other communication mechanism for communicating information, and a processor 1302 (e.g., processor 212 and 236) coupled with bus 1308 for processing information. By way of example, the computer system 1300 may be implemented with one or more processors 1302. Processor 1302 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1300 can include, in addition to hardware, code that creates an execution environment for the computer program in question, e.g., code that constitutes processor firmware, a protocol stack, a database management system, an operating system, or a combination of one or more of them stored in an included memory 1304 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1308 for storing information and instructions to be executed by processor 1302. The processor 1302 and the memory 1304 can be supplemented by, or incorporated in, special purpose logic circuitry.

The instructions may be stored in the memory 1304 and implemented in one or more computer program products, i.e., one or more modules of computer program instructions encoded on a computer readable medium for execution by, or to control the operation of, the computer system 1300, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1304 may also be used for storing temporary variable or other intermediate information during execution of instructions to be executed by processor 1302.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled to bus 1308 for storing information and instructions. Computer system 1300 may be coupled via input/output module 1310 to various devices. The input/output module 1310 can be any input/output module. Exemplary input/output modules 1310 include data ports such as USB ports. The input/output module 1310 is configured to connect to a communications module 1312. Exemplary communications modules 1312 (e.g., communications modules 218 and 238) include networking interface cards, such as Ethernet cards and modems. In certain aspects, the input/output module 1310 is configured to connect to a plurality of devices, such as an input device 1314 (e.g., input device 216) and/or an output device 1316 (e.g., output device 214). Exemplary input devices 1314 include a keyboard and a pointing device, e.g., a mouse or a trackball, by which a user can provide input to the computer system 1300. Other kinds of input devices 1314 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1316 include display devices, such as a LCD (liquid crystal display) monitor, for displaying information to the user.

According to one aspect of the present disclosure, the client 110 and server 130 can be implemented using a computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in main memory 1304 causes processor 1302 to perform the process steps described herein. One or more processors in a multi-processing arrangement may also be employed to execute the sequences of instructions contained in memory 1304. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, a desktop computer, laptop computer, or tablet computer. Computer system 1300 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving user input identifying a search query for content from a client device;
   determining a listing of images responsive to the search query from an image collection;
   providing at least one image of the listing of images to a trained convolutional neural network that determines a saliency of each pixel in the at least one image;
   obtaining one or more image crops for the at least one based on a saliency map of the at least one image, each of the one or more image crops indicating a salient region of a corresponding image;
   determining an integral image of the at least one image, each pixel value of the integral image being different from that of the at least one image based on the saliency map;
   for each fixed region with a predetermined aspect ratio within the at least one image, determining a sum of saliency for the fixed region based on the integral image;
   modifying the at least one image by cropping a region of the at least one image that corresponds to the fixed region having a maximum sum of saliency, the region of the at least one image being cropped to one of a plurality of predetermined aspect ratios; and
   providing a set of search results responsive to the search query to the client device, the set of search results including the obtained one or more image crops in a prioritized listing of image crops.

2. The computer-implemented method of claim 1, further comprising:
   determining the saliency of each pixel in the at least one image with respect to an overall scene of the at least one image; and
   generating the saliency map of the at least one image using the trained convolutional neural network.

3. The computer-implemented method of claim 1, further comprising:
   providing each image from the image collection to a saliency model;
   identifying salient portions of the image using the saliency model;

determining one or more image crops for the image from the identified salient portions of the image; and providing one or more tuples of image information for each image, each of the one or more tuples of image information indicating a respective image crop of the determined one or more image crops.

4. The computer-implemented method of claim 3, wherein each of the one or more tuples of image information include one or more of an image identifier for the image, an identifier indicating one image crop from the one or more image crops, and coordinates of the image crop.

5. The computer-implemented method of claim 3, further comprising:

providing metadata from each image in the image collection to a saliency index data structure;

providing each of the one or more tuples of image information to the saliency index data structure;

generating an association between each of the one or more tuples of image information with a corresponding image of the image collection in the saliency index data structure; and providing an index for each of generated association in the saliency index data structure.

6. The computer-implemented method of claim 5, further comprising:

providing the search query to an image search engine, the search query indicating a search term;

searching the search term against index entries of the saliency index data structure;

determining that the search term corresponds to the metadata from at least one index entry of the saliency index data structure;

determining a score for each image crop associated with an image from the at least one index entry using the metadata associated with the image; and providing a listing of images and a listing of image crops responsive to the search query, the listing of image crops being prioritized within the listing of images based on the determined scores, each image crop in the listing of image crops indicating a salient region of a corresponding image of the image collection.

7. The computer-implemented method of claim 6, wherein the determined score includes a first score of the image, a second score of the image crop and a weighting for the second score of the image crop.

8. The computer-implemented method of claim 5, further comprising:

providing the search query to an image search engine;

obtaining the listing of images based on the provided search query, at least one image from the listing of images having an aspect ratio that exceeds a predetermined aspect ratio threshold;

determining whether one or more image crops associated with the at least one of the listing of images are indexed;

obtaining at least one of the one or more image crops from the saliency index data structure when it is determined that the one or more image crops associated with the at least one image are indexed;

generating the one or more image crops from the at least one image based on the saliency map of the at least one image; and providing the one or more image crops in a prioritized listing of image crops, each of the one or more image crops having an aspect ratio that does not exceed the predetermined aspect ratio threshold, each of the one or more image crops indicating a salient region of a corresponding of the image collection.

9. The computer-implemented method of claim 1, further comprising:

providing the at least one image from the listing of images to a trained convolutional neural network that determines a saliency of each pixel in the at least one image with respect to an overall scene of the at least one image;

generating the saliency map of the at least one image using the trained convolutional neural network;

for each pixel in the at least one image, modifying a value of the pixel using a weighted filter to generate a masking for a non-salient region of the at least one image based on the saliency map; and providing the at least one image with the masking over the non-salient region of the at least one image.

10. The computer-implemented method of claim 1, further comprising:

providing a plurality of sets of training images to a computer-operated convolutional neural network, wherein the computer-operated convolutional neural network processes the plurality of sets of training images to learn to identify features relating to at least one of a plurality of object classes, wherein each of the plurality of sets of training images is associated with one object class of the plurality of object classes;

generating feature vectors for each training image in the plurality of sets of training images using the computer-operated convolutional neural network; and clustering the feature vectors into a plurality of clusters, wherein at least one of the plurality of clusters is associated with the search query.

11. The computer-implemented method of claim 10, further comprising:

generating processed pixel data including the feature vectors from the plurality of sets of training images;

determining a probability using the computer-operated convolutional neural network for an object class, the probability indicating a likelihood that a subject image corresponds to the object class; and providing an aggregate of probabilities that includes a probability for each object class in a set of object classes.

12. The computer-implemented method of claim 1, further comprising:

generating feature vectors for each image in the listing of image using a computer-operated convolutional neural network;

generating processed pixel data including the feature vectors for each image from the listing of images;

determining a saliency value using the computer-operated convolutional neural network for each pixel in the image, the saliency value indicating a likelihood that the pixel within the image is salient; and generating the saliency map using the saliency value of each pixel in the image.

13. A system comprising:

one or more processors;

a computer-readable storage medium coupled to the one or more processors, the computer-readable storage medium including instructions that, when executed by the one or more processors, cause the one or more processors to:

receive user input identifying a search query for content from a client device;

determine a listing of images responsive to the search query from an image collection;

provide at least one image of the listing of images to a trained convolutional neural network that determines a saliency of each pixel in the at least one image;

determine whether one or more image crops associated with the at least one image is indexed;

obtain at least one indexed image crop from a data structure when the one or more image crops associated with the at least one image are indexed;

generate one or more image crops from the at least one image based on a saliency map of the at least one image;

determine an integral image of the at least one image, each pixel value of the integral image being different from that of the at least one image based on the saliency map;

for each fixed region with a predetermined aspect ratio within the at least one image, determine a sum of saliency for the fixed region based on the integral image;

modify the at least one image by cropping a region of the at least one image that corresponds to the fixed region having a maximum sum of saliency, the region of the at least one image being cropped to one of a plurality of predetermined aspect ratios; and provide a set of search results responsive to the search query to the client device, the set of search results including the indexed image crops or the generated image crops in a prioritized listing of image crops, each image crop of the prioritized listing of image crops indicating a salient region of a corresponding image.

14. The system of claim 13, further comprising:
determining the saliency of each pixel in the at least one image with respect to an overall scene of the at least one image; and
generating the saliency map of the at least one image using the trained convolutional neural network.

15. The system of claim 13, further comprising:
providing each image from the image collection to a saliency model;
identifying salient portions of the image using the saliency model;
determining one or more image crops for the image from the identified salient portions of the image; and
providing one or more tuples of image information for each image, each of the one or more tuples of image information indicating a respective image crop of the determined one or more image crops.

16. The system of claim 15, further comprising:
providing metadata from each image in the image collection to a saliency index data structure;
providing each of the one or more tuples of image information to the saliency index data structure;
generating an association between each of the one or more tuples of image information with a corresponding image of the image collection in the saliency index data structure; and
providing an index for each of generated association in the saliency index data structure.

17. The system of claim 16, further comprising:
providing the search query to an image search engine, the search query indicating a search term;
searching the search term against index entries of the saliency index data structure;

determining that the search term corresponds to the metadata from at least one index entry of the saliency index data structure;
determining a score for each image crop associated with an image from the at least one index entry using the metadata associated with the image; and
providing a listing of images and a listing of image crops responsive to the search query, the listing of image crops being prioritized within the listing of images based on the determined scores, each image crop in the listing of image crops indicating a salient region of a corresponding image of the image collection.

18. The system of claim 16, further comprising:
providing the search query to an image search engine;
obtaining the listing of images based on the provided search query, at least one image from the listing of images having an aspect ratio that exceeds a predetermined aspect ratio threshold;
determining whether one or more image crops associated with the at least one of the listing of images are indexed;
obtaining at least one of the one or more image crops from the saliency index data structure when it is determined that the one or more image crops associated with the at least one image are indexed;
generating the one or more image crops from the at least one image based on the saliency map of the at least one image; and
providing the one or more image crops in a prioritized listing of image crops, each of the one or more image crops having an aspect ratio that does not exceed the predetermined aspect ratio threshold, each of the one or more image crops indicating a salient region of a corresponding of the image collection.

19. The system of claim 13, further comprising:
providing the at least one image from the listing of images to a trained convolutional neural network that determines a saliency of each pixel in the at least one image with respect to an overall scene of the at least one image;
generating the saliency map of the at least one image using the trained convolutional neural network;
for each pixel in the at least one image, modifying a value of the pixel using a weighted filter to generate a masking for a non-salient region of the at least one image based on the saliency map; and
providing the at least one image with the masking over the non-salient region of the at least one image.

20. A computer-implemented method, comprising:
receiving user input via an application on a client device, the user input indicating a request to initiate an image search;
generating, in response to the received user input, an image search query including a search term from the user input;
providing at least one image of a listing of images to a trained convolutional neural network that determines a saliency of each pixel in the at least one image;
providing for transmission the image search query over a connection to a server, the server including an image search service that obtains one or more image crops for the at least one image of the listing of images responsive to the image search query based on a saliency map of the at least one image, each of the one or more image crops indicating a salient region of a corresponding image;

determining an integral image of the at least one image, each pixel value of the integral image being different from that of the at least one image based on the saliency map;

for each fixed region with a predetermined aspect ratio within the at least one image, determining a sum of saliency for the fixed region based on the integral image;

modifying the at least one image by cropping a region of the at least one image that corresponds to the fixed region having a maximum sum of saliency, the region of the at least one image being cropped to one of a plurality of predetermined aspect ratios; and receiving a set of search results responsive to the search query from the server, the set of search results including the obtained one or more image crops in a prioritized listing of image crops.

* * * * *